United States Patent
Shige

(10) Patent No.: US 12,094,111 B2
(45) Date of Patent: Sep. 17, 2024

(54) ANALYSIS DEVICE, ANALYSIS SYSTEM, AND ANALYSIS METHOD

(71) Applicant: CANON MEDICAL SYSTEMS CORPORATION, Tochigi (JP)

(72) Inventor: Fumimasa Shige, Otawara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 367 days.

(21) Appl. No.: 17/457,967

(22) Filed: Dec. 7, 2021

(65) Prior Publication Data
US 2022/0180511 A1 Jun. 9, 2022

(30) Foreign Application Priority Data
Dec. 8, 2020 (JP) ................................. 2020-203331

(51) Int. Cl.
G06T 7/00 (2017.01)
G06V 10/20 (2022.01)

(52) U.S. Cl.
CPC .......... *G06T 7/0012* (2013.01); *G06V 10/255* (2022.01); *G06T 2207/30104* (2013.01)

(58) Field of Classification Search
CPC ......... G06T 7/0012; G06T 2207/30104; G06T 2207/10081; G06T 2207/10088; G06T 2207/10104; G06T 2207/10108; G06T 2207/30101; G06V 10/255
See application file for complete search history.

(56) References Cited

U.S. PATENT DOCUMENTS

| | | | |
|---|---|---|---|
| 7,175,597 B2* | 2/2007 | Vince | A61B 5/7264 600/443 |
| 8,311,748 B2* | 11/2012 | Taylor | A61B 6/5205 382/128 |
| 8,734,356 B2 | 5/2014 | Taylor | |
| 10,170,206 B2 | 1/2019 | Koo et al. | |
| 2010/0145901 A1* | 6/2010 | Han | A61P 29/00 706/52 |

(Continued)

OTHER PUBLICATIONS

Samady et al., "Coronary Artery Wall Shear Stress Is Associated With Progression and Transformation of Atherosclerotic Plaque and Arterial Remodeling in Patients With Coronary Artery Disease", Circulation 124.7, 2011, pp. 779-788.

*Primary Examiner* — Santiago Garcia
(74) *Attorney, Agent, or Firm* — Oblon, McClelland, Maier & Neustadt, L.L.P.

(57) ABSTRACT

An analysis device according to an embodiment includes processing circuitry. The processing circuitry extracts, from medical image data, the shape of a blood vessel of a subject and the shape of a plaque formed in the blood vessel. Then, while changing a first-type timing in sequence, the processing circuitry calculates a mechanical index, which is related to the plaque at the first-type timing, based on the shape of the blood vessel and the shape of the plaque at the first-type timing. Subsequently, based on the mechanical index at the first-type timing, the processing circuitry predicts the shape of the plaque at a second-type timing that is the next timing to the first-type timing. Then, the processing circuitry displays, in a display unit, the predicted shape of the plaque at the time second-type at which the plaque reaches a specific condition.

23 Claims, 10 Drawing Sheets

(56) References Cited

U.S. PATENT DOCUMENTS

| | | | |
|---|---|---|---|
| 2012/0041322 A1* | 2/2012 | Taylor | G06F 30/20 |
| | | | 600/508 |
| 2017/0224300 A1* | 8/2017 | Ishii | A61B 6/032 |
| 2018/0182101 A1* | 6/2018 | Petersen | G06T 7/11 |
| 2020/0098124 A1* | 3/2020 | Wang | A61B 5/7267 |
| 2020/0126219 A1 | 4/2020 | Wang et al. | |
| 2022/0012877 A1* | 1/2022 | Buckler | G06T 7/0012 |
| 2022/0277456 A1* | 9/2022 | Woolf | G06V 10/766 |

\* cited by examiner

ANALYSIS DEVICE, ANALYSIS SYSTEM, AND ANALYSIS METHOD

CROSS-REFERENCE TO RELATED APPLICATIONS

This application is based upon and claims the benefit of priority from Japanese Patent Application No. 2020-203331, filed on Dec. 8, 2020; the entire contents of which are incorporated herein by reference.

FIELD

Embodiments described herein relate generally to an analysis device, an analysis system, and an analysis method.

BACKGROUND

In regard to planning a treatment strategy for a blood vessel disease, it becomes important for the doctor to get to know about the future condition of a plaque formed in a blood vessel wall. Particularly, in order to enhance the life prognosis of the patient, it is extremely important for the doctor to get to know whether or not the acute coronary syndrome is likely to develop in which a coronary artery gets clogged due to the rupture of a plaque.

In recent years, as the index for predicting whether or not a plaque formed on the vascular wall of a blood vessel, such as a coronary artery, would grow in size; the focus has been on the shear stress that is exerted on the plaque (i.e., the wall shear stress (WSS)). For example, based on the magnitude of the WSS, it is possible to predict whether or not the plaque would grow in size, from the current size, in the relatively near future (for example, after six months or one year). For example, the WSS is calculated in the following manner: from the medical image data such CT image data (CT stands for Computer Tomography), the shape of such a blood vessel of the patient which includes a plaque or vascular calcification is extracted; and a variety of simulation such as finite element simulation or simulation using an equivalent circuit model is performed using the extracted shape of the blood vessel.

DETAILED DESCRIPTION

Figure 1:
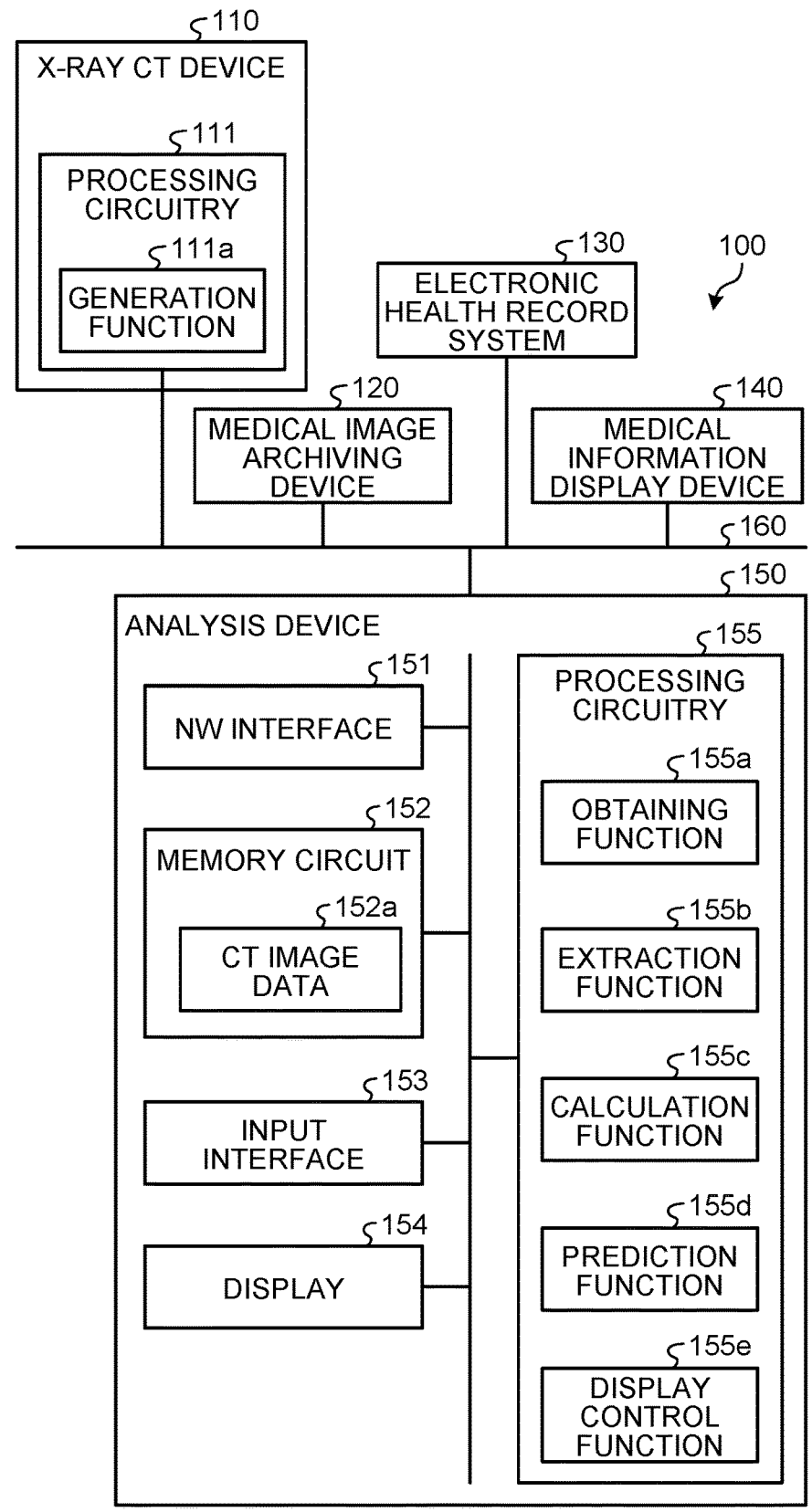
FIG. 1 is a diagram illustrating an exemplary configuration of an analysis system and an analysis device according to a first embodiment.

According to the embodiments disclosed in the present specification and the drawings, one of the problems to be resolved is to predict the condition of a plaque in the relatively distant future (for example, a few years later such as two years later). However, the problem to be resolved according to the embodiments disclosed in the present specification and the drawings is not limited to the above-mentioned problem. That is, the problems corresponding to the effects achieved as a result of implementing various configurations according to the embodiments described below can be treated as other problems.

An analysis device according to an embodiment includes processing circuitry. The processing circuitry extracts, from medical image data, the shape of a blood vessel of a subject and the shape of a plaque formed in the blood vessel. Then, while changing a first-type timing in sequence, the processing circuitry calculates a mechanical index, which is related to the plaque at the first-type timing, based on the shape of the blood vessel and the shape of the plaque at the first-type timing. Subsequently, based on the mechanical index at the first-type timing, the processing circuitry predicts the shape of the plaque at a second-type timing that is the next timing to the first-type timing. Then, the processing circuitry displays, in a display unit, the predicted shape of the plaque at the time second-type at which the plaque reaches a specific condition.

Exemplary embodiments and modification examples of an analysis device, an analysis system, and an analysis method are described below in detail with reference to the accompanying drawings. Meanwhile, the embodiments can be combined with the conventional technology, other embodiments, and other modification examples without causing contradictions in the details. In an identical manner, the modification examples can be combined with the conventional technology, other embodiments, and other modification examples without causing contradictions in the details. In the following explanation, identical constituent elements are referred to by the same reference numerals, and the redundant explanation is not given.

First Embodiment

FIG. 1 is a diagram illustrating an exemplary configuration of an analysis system 100 and an analysis device 150 according to a first embodiment. For example, as illustrated in FIG. 1, the analysis system 100 according to the first embodiment includes an X-ray CT device 110 (CT stands for Computed Tomography), a medical image archiving device 120, an electronic health record system 130, a medical information display device 140, and the analysis device 150. The X-ray CT device 110, the medical image archiving device 120, the electronic health record system 130, the medical information display device 140, and the analysis device 150 are communicably connected to each other via a network 160.

Moreover, in addition to including the X-ray CT device 110, the analysis system 100 can also include other medical image diagnostic devices such as an MRI device (MRI stands for Magnetic Resonance Imaging), an ultrasound diagnostic device, a PET device (PET stands for Positron Emission Tomography), and a SPECT device (SPECT stands for Single Photon Emission Computed Tomography). Furthermore, in addition to including the electronic health record system 130, the analysis system 100 can also include other systems such as a hospital information system (HIS) and a radiology information system (RIS).

The X-ray CT device 110 generates CT image data related to the subject. As illustrated in FIG. 1, the X-ray CT device 110 includes processing circuitry 111 that is implemented using, for example, a processor. The processing circuitry 111 includes a generation function 111a. For example, the generation function 111a, which represents the constituent element of the processing circuitry 111 illustrated in FIG. 1, is stored as a computer-executable program in a memory circuit included in the X-ray CT device 110. The processing circuitry 111 reads the computer program from the memory circuit and executes it, so that the generation function 111a corresponding to the computer program gets implemented. In other words, upon reading the computer program, the processing circuitry 111 happens to include the generation function 111a as illustrated within the processing circuitry 111 in FIG. 1. The generation function 111a represents an example of a generating unit.

In the X-ray CT device 110, an X-ray tube and an X-ray detector are gyred in a circular orbit around the subject, and projection data is collected that represents the distribution of the X rays which have passed through the subject. Then, based on the collected projection data, the generation function 111a of the X-ray CT device 110 generates CT image data. For example, the generation function 111a generates CT image data 152a which is two-dimensional or three-dimensional in nature and in which the blood vessels of the subject and the plaques formed on the vascular walls are drawn. For example, in the CT image data 152a, a coronary artery is drawn as an example of a blood vessel. Alternatively, the blood vessel drawn in the CT image data 152a can be some other blood vessel other than a coronary artery.

In the first embodiment, the CT image data 152a represents CT image data obtained by the X-ray CT device 110 by performing imaging at a timing $T_0$. For that reason, the blood vessel and the plaque drawn in the CT image data 152a represents the blood vessel at the timing $T_0$ and the plaque at the timing $T_0$.

Then, the X-ray CT device 110 sends the CT image data 152a to the medical image archiving device 120 and the analysis device 150 via the network 160. Meanwhile, the CT image data 152a represents an example of medical image data.

The medical image archiving device 120 archives a variety of medical image data related to the subject. More particularly, the medical image archiving device 120 obtains CT image data from the X-ray CT device 110 via the network 160, and stores the obtained CT image data in an internal memory circuit. For example, the medical image archiving device 120 is implemented using a computer device such as a server or a work station. Alternatively, for example, the medical image archiving device 120 is implemented using the picture archiving and communication system (PACS), and archives CT images in a DICOM-compatible format (DICOM stands for Digital Imaging and Communications in Medicine).

The electronic health record system 130 archives medical examination records of the subject and a variety of medical examination data related to patient information. More particularly, the electronic health record system 130 either generates medical examination data related to the subject, or obtains the medical examination data related to the subject from another device via the network 160; and stores the obtained medical examination data in an internal memory circuit. For example, the electronic health record system 130 is implemented using a computer device such as a server or a workstation.

The medical information display device 140 displays a variety of medical information regarding the subject. More particularly, the medical information display device 140 obtains medical information, such as CT image data, and results of image processing from the analysis device 150 via the network 160; and displays such medical information in a display installed therein. For example, the medical information display device 140 is implemented using a computer device such as a workstation, a personal computer, or a tablet terminal.

The analysis device 150 performs a variety of analysis and a variety of image processing with respect to the medical image data such as the CT image data. More particularly, the analysis device 150 obtains the CT image data from the X-ray CT device 110 or the medical image archiving device 120 via the network 160, and performs a variety of analysis and a variety of image processing with respect to the obtained CT image data. For example, the analysis device 150 is implemented using a computer device such as a server or a workstation.

As illustrated in FIG. 1, the analysis device 150 includes a network (NW) interface 151, a memory circuit 152, an input interface 153, a display 154, and processing circuitry 155.

The NW interface 151 controls the transmission of a variety of data and communication between the analysis device 150 and other devices or the electronic health record system 130 connected to the analysis device 150 via the network 160. More particularly, the NW interface 151 is connected to the processing circuitry 155; and outputs the data received from other devices to the processing circuitry 155 or sends the data output from the processing circuitry 155 to other devices or the electronic health record system 130. The NW interface 151 is implemented using, for example, a network card, a network adaptor, or a network interface controller (NIC).

The memory circuit 152 is used to store a variety of data and various computer programs. More particularly, the memory circuit 152 is connected to the processing circuitry 155; and is used to store a variety of data under the control of the processing circuitry 155. Moreover, the data stored in the memory circuit 152 is obtained (read) by the processing circuitry 155. For example, the memory circuit 152 is implemented using a semiconductor memory device such as a random access memory (RAM) or a flash memory; or using a hard disk; or using an optical disk.

The input interface 153 receives input operations regarding various instructions and a variety of information from the user of the analysis system 100. More particularly, the input interface 153 is connected to the processing circuitry 155; and converts an input operation received from the user into an electrical signal and outputs it to the processing circuitry 155. The input interface 153 is implemented using, for example, one of the following: a trackball; switch buttons; a mouse; a keyboard; a touchpad for performing input operations by touching an operation screen; a touch-sensitive screen in which a display screen and a touchpad are integrated; a contactless input interface in which an optical sensor is used; or a voice interface. Meanwhile, in the present written description, the input interface 153 is not limited to be a physical operating component such as a mouse or a keyboard. Alternatively, as an example, as the input interface 153, it is possible to use an electrical signal processing circuit that receives an electrical signal corresponding to an input operation from an external input device installed separately from the analysis device 150, and then outputs the electrical signal to the processing circuitry 155. For example, the processing circuitry 155 is implemented using a processor. The input interface 153 represents an example of a receiving unit.

The display 154 displays a variety of information and a variety of data. More particularly, the display 154 is connected to the processing circuitry 155, and displays various images based on a variety of image data received from the processing circuitry 155 and displays a variety of information and a variety of data. For example, the display 154 is implemented using a liquid crystal monitor, a cathode ray tube (CRT) monitor, or a touch-sensitive panel. The display 154 represents an example of a display unit.

The processing circuitry 155 controls the analysis device 150 in entirety. For example, the processing circuitry 155 performs a variety of processing according to the input operations received from the user via the input interface 153. For example, the processing circuitry 155 receives input of data, which is sent from another device, via the NW interface 151; and stores the input data in the memory circuit 152. Moreover, for example, an obtaining function 155a (explained later) of the processing circuitry 155 receives (obtains) the CT image data 152a from the X-ray CT device 110 via the NW interface 151, and stores the CT image data 152a in the memory circuit 152 as illustrated in FIG. 1. Moreover, for example, the processing circuitry 155 controls the NW interface 151 in such a way that the data obtained from the memory circuit 152 is sent to another device or to the electronic health record system 130. As a result, the NW interface 151 sends the data to another device or to the electronic health record system 130. Furthermore, for example, the processing circuitry 155 displays the data, which is obtained from the memory circuit 152, in the display 154. For example, the processing circuitry 155 is implemented using a processor.

Till now, the explanation was given about an exemplary configuration of the analysis system 100 and the analysis device 150 according to the first embodiment. For example, the analysis system 100 and the analysis device 150 according to the first embodiment are installed in a medical facility such as a hospital or a health clinic; and support the user, such as a doctor, to perform diagnosis related to the diseases of blood vessels, such as a coronary artery, and to formulate a treatment plan.

For example, generally, the shear stress exerted on a plaque formed on the vascular wall of a blood vessel such as a coronary artery (i.e., the wall shear stress (WSS)) is used as the index for predicting whether or not the plaque would grow in size. In the following explanation, "the shear stress exerted on a plaque" is terms as "the WSS exerted on a plaque". For example, based on the magnitude of the WSS exerted on a plaque, it is possible to predict whether or not the plaque would grow in size, from the current size, in the relatively near future (for example, after six months or one year). However, it is difficult to predict the condition of the plaque in the relatively distant future (for example, a few years later such as two years later).

In that regard, as explained below, the analysis system 100 and the analysis device 150 according to the first embodiment are configured to predict the condition of a plaque in the relatively distant future.

For example, as illustrated in FIG. 1, the processing circuitry 155 includes the obtaining function 155a, an extraction function 155b, a calculation function 155c, a prediction function 155d, and a display control function 155e. The obtaining function 155a represents an example of an obtaining unit. The extraction function 155b represents an example of an extracting unit. The calculation function 155c represents an example of a calculating unit. The prediction function 155d represents an example of a predicting unit. The display control function 155e represents an example of a display control unit.

Herein, for example, the obtaining function 155a, the extraction function 155b, the calculation function 155c, the prediction function 155d, and the display control function 155e that are the constituent elements of the processing circuitry 155 illustrated in FIG. 1 are stored as computer-executable programs in the memory circuit 152. The processing circuitry 155 reads the computer programs from the memory circuit 152 and executes them so that the corresponding functions are implemented. In other words, upon reading the computer programs, the processing circuitry 155 happens to include the functions as illustrated within the processing circuitry 155 in FIG. 1.

Figure 2:
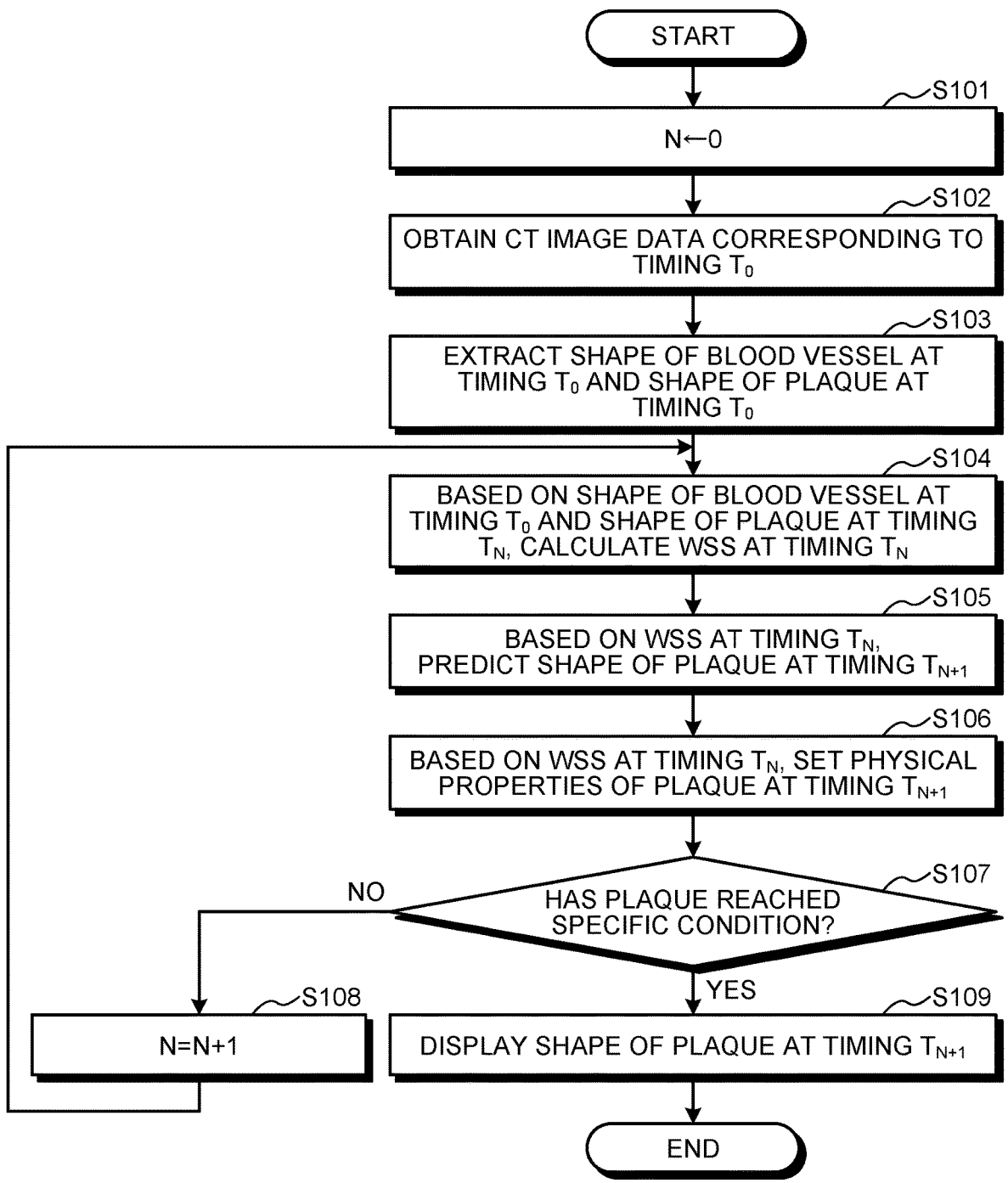
FIG. 2 is a flowchart for explaining an exemplary flow of an analysis operation performed in the analysis device according to the first embodiment.

FIG. 2 is a flowchart for explaining an exemplary flow of an analysis operation performed in the analysis device 150 according to the first embodiment. The analysis operation represents the operation of performing analysis with respect to the CT image data 152a for the purpose of obtaining the result of prediction of the condition of the plaque in the relatively distant future. For example, the analysis operation is performed when the CT image data 152a is stored in the memory circuit 152 and when the processing circuitry 155 receives an instruction from the user, such as a doctor, via the input interface 153 for performing the analysis operation.

As illustrated in FIG. 2, the obtaining function 155a sets a variable N to "0" as the initial value (Step S101). Then, the obtaining function 155a obtains the CT image data 152a corresponding to the timing $T_0$ from the memory circuit 152 (Step S102).

Figure 3:
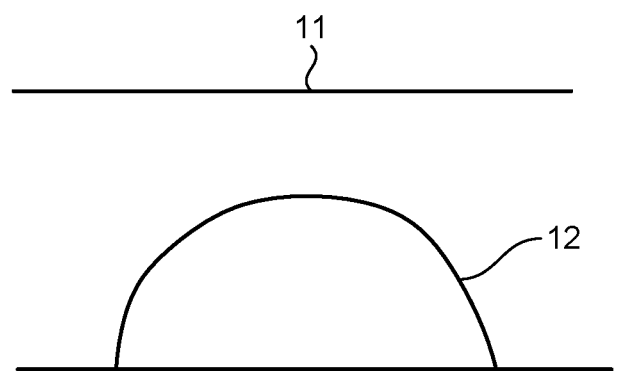
FIGS. 3 to 6 are diagrams for explaining examples of the operations performed in the analysis device according to the first embodiment.

Subsequently, the extraction function 155b extracts the shape of the blood vessel at the timing $T_0$ and the shape of the plaque at the timing $T_0$ from the CT image data 152a (Step S103). FIG. 3 is a diagram for explaining an example of the operations performed in the analysis device 150 according to the first embodiment. For example, at Step S103, as illustrated in FIG. 3, the extraction function 155b extracts the shape of a blood vessel 11 at the timing $T_0$ and the shape of a plaque 12 at the timing $T_0$ from the CT image data 152a.

Then, based on the shape of the blood vessel 11 at the timing $T_0$ and based on the shape of the plaque 12 at a timing $T_N$, the calculation function 155c calculates the WSS exerted on the plaque 12 at the timing $T_N$ (Step S104). For example, if the variable N is set to the initial value of "0", at Step S104, the calculation function 155c calculates the WSS exerted on the plaque 12 at the timing $T_0$ based on the shape of the blood vessel 11 at the timing $T_0$ and the shape of the plaque 12 at the timing $T_0$. The WSS exerted on the plaque 12 represents an example of the shear stress, and also represents an example of a mechanical index indicating the shear stress.

As far as the WSS calculation is concerned, various methods are available as the known technology. Thus, at Step S104, the calculation function 155c implements a known technology and calculates the WSS exerted on the plaque 12. For example, regarding various parameters such as the quantity of blood flowing into the blood vessel 11 per unit time, the speed of the blood flowing into the blood vessel 11, the quantity of blood flowing away from the blood vessel 11 per unit time, the speed of the blood flowing away from the blood vessel 11, the cross-sectional area of the blood vessel 11 at the inflow position thereof, the cross-sectional area of the blood vessel 11 at the outflow position thereof, the pressure of the blood at the inflow position of the blood vessel 11, and the pressure of the blood at the outflow position of the blood vessel 11; the values are fixed in advance. The calculation function 155c uses such various parameters and performs a variety of simulation meant for calculating the WSS exerted on the plaque 12. As a result, the WSS exerted on the plaque 12 gets calculated. For example, using various parameters and based on the shape of the blood vessel 11 and the shape of the plaque 12; the calculation function 155c performs finite element simulation with respect to the blood flow or performs simulation using an equivalent circuit model, and calculates the WSS exerted on the plaque 12. Meanwhile, the quantity of blood flowing into the blood vessel 11 per unit time, the speed of the blood flowing into the blood vessel 11, and the pressure of the blood at the inflow position of the blood vessel 11 represent the parameters related to the blood flowing into the blood vessel 11. On the other hand, the quantity of blood flowing away from the blood vessel 11 per unit time, the speed of the blood flowing away from the blood vessel 11, and the pressure of the blood at the outflow position of the blood vessel 11 represent the parameters related to the blood flowing away from the blood vessel 11. As explained above, at Step S104, the calculation function 155c calculates the fluid parameters in the blood vessel 11 at least based on the shape of the blood vessel 11; and then calculates the WSS exerted on the plaque 12 at the timing $T_N$ based on the shape of the blood vessel 11 at the timing $T_0$, the shape of the plaque 12 at the timing $T_N$, and the calculated fluid parameters.

Subsequently, based on the WSS exerted on the plaque 12 at the timing $T_N$, the prediction function 155d predicts the shape of the plaque 12 at the timing $T_{N+1}$ (Step S105). Herein, the time interval (the time step) between the timing $T_N$ and the next timing $T_{N+1}$ is equal to, for example, one month. That is, at Step S105, based on the WSS exerted on the plaque 12 at the timing $T_N$, the prediction function 155d predicts the shape of the plaque 12 at the future timing $T_{N+1}$ that would arrive after one month from the timing $T_N$. More particularly, for example, when the variable N is set to the initial value of "0", based on the WSS exerted on the plaque 12 at the timing $T_0$, the prediction function 155d predicts the shape of the plaque 12 at a future timing $T_1$ that would arrive after one month from the timing $T_0$.

Figure 4:
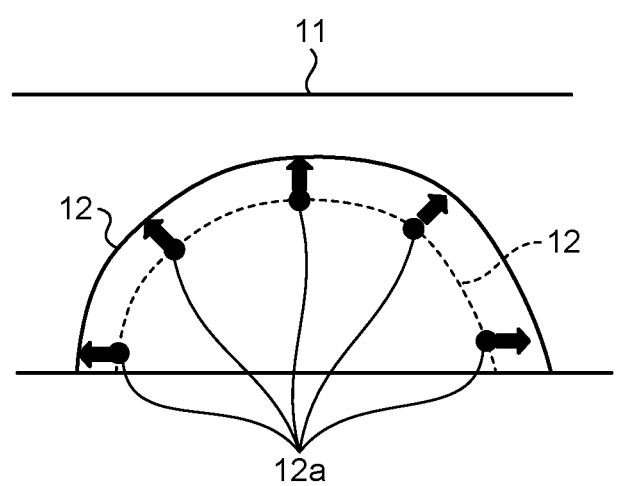

Given below is the explanation of a specific example of the operation performed by the prediction function 155d at Step S105. FIG. 4 is a diagram for explaining an example of the operations performed in the analysis device 150 according to the first embodiment. In FIG. 4, the plaque 12 at the timing $T_N$ is illustrated using a dotted line, and the plaque 12 at the timing $T_{N+1}$ is illustrated using a continuous line.

At Step S105, firstly, the prediction function 155d determines whether or not the magnitude of the WSS exerted on the plaque 12 at the timing $T_N$ falls below a first threshold value α. For example, when the magnitude of the WSS falls below the first threshold value α, it implies that the magnitude of the WSS is smaller than the first threshold value α. When the magnitude of the WSS falls below the first threshold value α, it is believed that the plaque 12 would grow in size. In that regard, when the magnitude of the WSS falls below the first threshold value α; as illustrated in FIG. 4, the prediction function 155d predicts, as the shape of the plaque 12 at the timing $T_{N+1}$, the shape of the plaque 12 obtained by enlarging the shape of the plaque 12 by a predetermined size at a plurality of positions 12a on the outer surface of the plaque 12 corresponding to the timing $T_N$ in the normal directions of the positions 12a. Herein, the predetermined size is equal to, for example. 0.01 mm. In this way, the prediction function 155d enlarges the shape of the plaque 12 corresponding to the timing $T_N$ and predicts the shape of the plaque 12 at the timing $T_{N+1}$. That is, the prediction function 155d enlarges the shape of the plaque at the timing $T_{N+1}$ as compared to the shape of the plaque 12 at the timing $T_N$, and thus predicts the shape of the plaque 12 at the timing $T_{N+1}$.

Meanwhile, also when the magnitude of the WSS exerted on the plaque 12 falls below the first threshold value α and when the maximum value of the difference in the WSS in one pulsation exceeds a second threshold value β, it is believed that the plaque 12 would grow in size. In that regard, at Step S105, the prediction function 155d can determine whether or not the magnitude of the WSS exerted on the plaque 12 at the timing $T_N$ falls below the first threshold value α and whether or not the maximum value of the difference in the WSS in one pulsation exceeds the second threshold value β. Herein, the maximum value of the difference in the WSS in one pulsation is, for example, the difference between the maximum value and the minimum value of the WSS in one pulsation. Moreover, when the maximum value of the difference in the WSS exceeds the second threshold value β, it implies that the maximum value of the difference in the WSS is greater than the second threshold value β. When the magnitude of the WSS exerted on the plaque 12 at the timing $T_N$ falls below the first threshold value α and when the maximum value of the difference in the WSS in one pulsation exceeds the second threshold value β, the prediction function 155d enlarges the shape of the plaque 12 corresponding to the timing $T_N$ and predicts the shape of the plaque 12 at the timing $T_{N+1}$.

Moreover, also when the maximum value of the difference in the WSS in one pulsation exceeds the second threshold value β, it is believed that the plaque 12 would grow in size. In that regard, at Step S105, the prediction function 155d can determine whether or not the maximum value of the difference in the WSS in one pulsation exceeds the second threshold value β. In that case, if the maximum value of the difference in the WSS in one pulsation exceeds the second threshold value β; then, as explained above, the prediction function 155d can enlarge the shape of the plaque 12 corresponding to the timing $T_N$ and predict the shape of the plaque at the timing $T_{N+1}$.

Meanwhile, also in the case in which the difference between the WSS in a predetermined time phase during systole in one pulsation and the WSS in a predetermined time phase during diastole in one pulsation exceeds a threshold value, it is believed that the plaque 12 would grow in size. In that regard, at Step S105, the prediction function 155d can determine whether or not the difference between the WSS in a predetermined time phase during systole in one pulsation and the WSS in a predetermined time phase during diastole in one pulsation exceeds the threshold value. If the difference between the WSS in a predetermined time phase during systole in one pulsation and the WSS in a predetermined time phase during diastole in one pulsation exceeds the threshold value; then, as explained above, the prediction function 155d can enlarge the shape of the plaque corresponding to the timing $T_N$ and predict the shape of the plaque at the timing $T_{N+1}$. The predetermined time phase during systole represents an example of a first-type time phase. The predetermined time phase during diastole represents an example of a second-type time phase.

Meanwhile, if the magnitude of the WSS falls below the first threshold value α, or if the magnitude of the WSS falls below the first threshold value α and if the maximum value of the difference in the WSS in one pulsation exceeds the second threshold value β; then the prediction function 155d can enlarge the shape of the plaque 12 at the timing $T_N$ according to another method other than the method explained above.

For example, the prediction function 155d can enlarge the shape of the plaque 12 at the timing $T_N$ by increasing the volume of the plaque 12 at the timing $T_N$ by 1%. At that time, in each such region of the plaque 12 which is not making contact with the blood vessel 11, the prediction function 155d can enlarge the shape of the plaque 12 by a certain percentage in the normal direction of the outer surface of the plaque 12.

Alternatively, for example, at each of a plurality of positions 12a on the outer surface of the plaque 12 corresponding to the timing $T_N$, the prediction function 155d can enlarge the shape of the plaque 12 in the corresponding normal direction by the size that is in accordance with the magnitude of the WSS. For example, if "P" represents the magnitude of the WSS, then "the size that is in accordance with the magnitude of the WSS" is equal to "0.01×C1×(1/P)". Herein, "C1" represents a positive coefficient.

Returning to the explanation with reference to FIG. 2, the prediction function 155d sets the physical properties of the plaque at the timing $T_{N+1}$ based on the WSS exerted on the plaque at the timing $T_N$ (Step S106).

Given below is the specific example of the operation performed at Step S106. For example, if the magnitude of the WSS exerted on the plaque 12 at the timing $T_N$ is equal to or greater than the first threshold value α, it is believed that a fibrous capsule develops on the outer surface of the plaque 12. For example, the plaque 12 is made of a plurality of components including a fibrous capsule, calcium, and fatty materials. Thus, if the magnitude of the WSS is equal to or greater than the first threshold value α, it is believed that there is an increase in the proportion of the fibrous capsule with respect to a plurality of components. As compared to the fatty materials, the fibrous capsule is a hard component. Hence, if there is an increase in the proportion of the fibrous capsule with respect to a plurality of components, the plaque 12 becomes harder.

In that regard, at Step S106, if the magnitude of the WSS is equal to or greater than the first threshold value α, then the prediction function 155d sets the physical properties of the plaque 12 corresponding to the timing $T_{N+1}$ in such a way that the plaque 12 at the timing $T_{N+1}$ would be harder than the plaque 12 at the timing $T_N$. For example, the prediction function 155d varies the physical properties of the plaque 12 in such a way that the proportion of the fibrous capsule with respect to all components of the plaque 12 at the timing $T_{N+1}$ becomes greater than the proportion of the fibrous capsule with respect to all components of the plaque 12 at the timing $T_N$; and thus sets the physical properties of the plaque 12 corresponding to the timing $T_{N+1}$.

For example, the prediction function 155d changes a predetermined number of fatty materials, from among all fatty materials included in the outer surface of the plaque 12 at the timing $T_N$, to the fibrous capsule, and thus sets the physical properties of the plaque 12 corresponding to the timing $T_{N+1}$. Meanwhile, the prediction function 155d can divide the outer surface of the plaque 12 corresponding to the timing $T_N$ into a plurality of regions; randomly select regions from among those regions; change the components included in the selected regions to the fibrous capsule; and thus set the physical properties of the plaque 12 corresponding to the timing $T_{N+1}$.

Moreover, at Step S106, the prediction function 155d determines whether or not the magnitude of the WSS exerted on the plaque 12 at the timing $T_N$ is equal to or smaller than a third threshold value γ that is smaller than the first threshold value α. When the magnitude of the WSS is equal to or smaller than the third threshold value γ, it is believed that the plaque 12 would grow to include more fatty materials. Hence, when the magnitude of the WSS is equal to or smaller than the third threshold value γ, it is believed that there is an increase in the proportion of the fatty materials with respect to a plurality of components. As compared to calcium and the fibrous capsule, the fatty materials are softer components. Hence, if there is an increase in the proportion of the fatty materials with respect to a plurality of components, the plaque 12 becomes softer.

In that regard, at Step S106, if the magnitude of the WSS is equal to or smaller than the third threshold value γ, then the prediction function 155d sets the physical properties of the plaque 12 corresponding to the timing $T_{N+1}$ in such a way that the plaque 12 at the timing $T_{N+1}$ would be softer than the plaque 12 at the timing $T_N$. For example, the prediction function 155d varies the physical properties of the plaque 12 in such a way that the proportion of the fatty materials with respect to all components of the plaque 12 at the timing $T_{N+1}$ becomes greater than the proportion of the fatty materials with respect to all components of the plaque 12 at the timing $T_N$; and thus sets the physical properties of the plaque 12 corresponding to the timing $T_{N+1}$.

For example, the prediction function 155d changes a predetermined amount of fibrous capsule and calcium, from among all fibrous capsule and calcium included in the outer surface of the plaque 12 at the timing $T_N$, to fatty materials; and thus sets the physical properties of the plaque 12 corresponding to the timing $T_{N+1}$. Meanwhile, the prediction function 155d can divide the outer surface of the plaque 12 corresponding to the timing $T_N$ into a plurality of regions; randomly select regions from among those regions; change the components included in the selected regions to the fatty materials; and thus set the physical properties of the plaque 12 corresponding to the timing $T_{N+1}$.

Subsequently, the calculation function 155c determines whether or not the plaque 12 is in a specific condition at the timing $T_{N+1}$ (Step S107).

Figure 5:
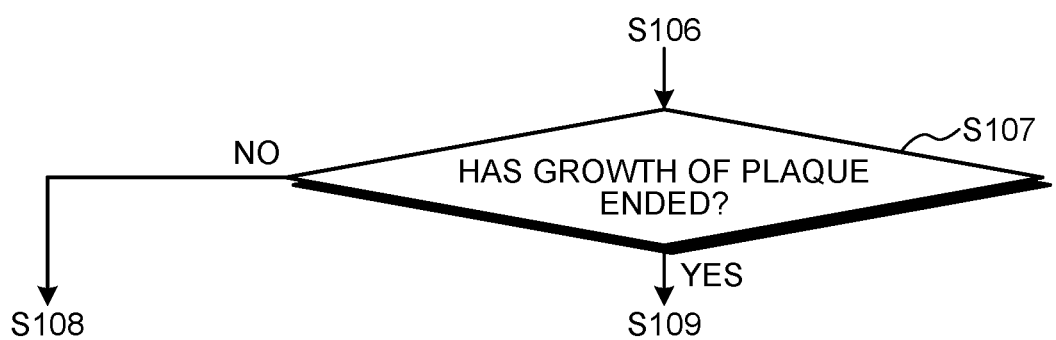

Given below is the explanation of a specific example of the operation performed by the calculation function 155c at Step S107. FIG. 5 is a diagram for explaining an example of the operations performed in the analysis device 150 according to the first embodiment. For example, at Step S107, the calculation function 155c determines whether or not the growth of the plaque 12 has ended at the timing $T_{N+1}$. For example, the calculation function 155c calculates the distance from each position 12a on the plaque 12 at the timing $T_N$ to the corresponding position 12a on the plaque 12 at the timing $T_{N+1}$. As a result, a plurality of distances get calculated. Then, the calculation function 155c calculates the average value of those distances. Subsequently, the calculation function 155c determines whether or not the average value is equal to or smaller than a predetermined threshold value δ. If the average value is equal to or smaller than the predetermined threshold value δ, then the calculation function 155c determines that the growth of the plaque 12 has ended at the timing $T_{N+1}$. On the other hand, if the average value is greater than the predetermined threshold value δ, then the calculation function 155c determines that the growth of the plaque 12 has not ended at the timing $T_{N+1}$.

Meanwhile, at Step S107, if the magnitude of the WSS exerted on the plaque 12 at the timing $T_N$ is equal to or greater than a threshold value (for example, the first threshold value α), then the calculation function 155c can determine that the growth of the plaque 12 has ended. On the other hand, if the magnitude of the WSS exerted on the plaque 12 at the timing $T_N$ is falls below the threshold value (for example, the first threshold value α), then the calculation function 155c can determine that the growth of the plaque 12 has not ended. Moreover, at Step S107, if the maximum value of the difference in the WSS in one pulsation is equal to or smaller than the second threshold value β, then the calculation function 155c can determine that the growth of the plaque 12 has ended. On the other hand, if the maximum value of the difference in the WSS in one pulsation exceeds the second threshold value β, then the calculation function 155c can determine that the growth of the plaque 12 has not ended.

If the plaque 12 has not reached the specific condition at the timing $T_{N+1}$ (No at Step S107), that is, if the growth of the plaque 12 has not ended at the timing $T_{N+1}$, then the calculation function 155c increments the value of the variable N by one (Step S108). By incrementing the value of the variable N by one, the calculation function 155c derives the next timing to the timing $T_N$ (where N represents the variable before incrementation by one) as the new timing $T_N$ (where N represents the variable after incrementation by one). For example, when the value of the variable N is equal to "0", as a result of incrementing the value of the variable N by one, the calculation function 155c derives the timing $T_1$ that is the next timing to the timing $T_0$. In an identical manner, when the value of the variable N is equal to "k (where k is an integer equal to or greater than "1"), as a result of incrementing the value of the variable N by one, the calculation function 155c derives the timing $T_{k+1}$ that is the next timing to the timing $T_k$. Herein, each timing after the timing $T_0$ represents an example of a first-type timing. Moreover, a timing next to such a first-type timing represents an example of a second-type timing.

From Step S108, the system control returns to Step S104, and the calculation function 155c and the prediction function 155d again perform the operations from Step S104 to Step S107.

After the system control returns from Step S108 to Step S104; at Step S104, the calculation function 155c uses the shape of the blood vessel at the timing $T_0$ and uses the shape of the plaque 12 at the timing $T_N$ as predicted at Step S105, and calculates the WSS exerted on the plaque 12 at the timing $T_N$.

Thus, until the plaque 12 reaches the specific condition (Yes at Step S107), the operation at Step S108 for incrementing the value of the variable N is performed in a repeated manner; and, every time the value of the variable N is incremented by one, the operations from Step S104 to Step S107 are performed. For example, until the growth of the plaque 12 ends, every time the value of the variable N is incremented, the operations from Step S104 to Step S107 are performed.

Meanwhile, in the first embodiment, until the growth of the plaque 12 ends, every time the WSS exerted on the plaque 12 at the timing $T_k$ is calculated, the shape of the plaque 12 at the timing $T_{k+1}$, which is the next timing to the timing $T_k$, is predicted based on the calculated WSS.

Figure 6:
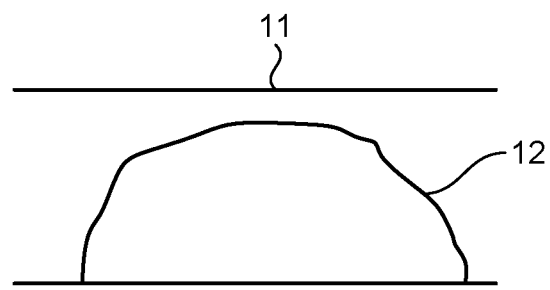

FIG. 6 is a diagram for explaining an example of the operations performed in the analysis device 150 according to the first embodiment. With reference to FIG. 6, the explanation is given about an example of the operation performed by the display control function 155e when the plaque 12 reaches the specific condition at the timing $T_{N+1}$ (Yes at Step S107), that is, when the growth of the plaque 12 has ended at the timing $T_{N+1}$. When the plaque 12 reaches the specific condition (Yes at Step S107); as illustrated in FIG. 6, the display control function 155e displays, in the display 154, the shape of the plaque 12 at the timing $T_{N+1}$ as predicted at Step S105 (Step S109).

That is, at Step S109, the display control function 155e displays, in the display 154, the shape of the plaque 12 at the timing $T_{N+1}$ at which the plaque 12 reached the specific condition (i.e., the timing corresponding to the case when the plaque 12 reaches the specific condition). More particularly, the display control function 155e displays, in the display 154, the shape of the plaque at the timing $T_{N+1}$ at which the growth of the plaque 12 has ended. Then, the display control function 155e ends the analysis operation.

Till now, the explanation was given about the analysis device 150 and the analysis system 100 according to the first embodiment. The analysis device 150 and the analysis system 100 predict the shape of the plaque 12 at the timing $T_{N+1}$ at which the plaque 12 reaches a specific condition. More particularly, the analysis device 150 and the analysis system 100 predict the shape of the plaque 12 at the timing $T_{N+1}$ at which the growth of the plaque 12 has ended. Herein, for example, the timing $T_{N+1}$ is the timing arriving after a few years such as two years from the timing $T_0$. Thus, according to the first embodiment, it becomes possible to predict the condition of the plaque in the relatively distant future (for example, a few years later).

Moreover, the analysis device 150 and the analysis system 100 display the condition of the plaque 12 at the timing $T_{N+1}$ at which the plaque 12 reaches the specific condition. More particularly, the analysis device 150 and the analysis system 100 display the shape of the plaque 12 at the timing $T_{N+1}$ at which the growth of the plaque 12 has ended. Thus, according to the first embodiment, it becomes possible for the user, such as a doctor, to confirm the condition of the plaque in the relatively distant future. As a result, it becomes possible to support the user, such as a doctor, to perform diagnosis related to the diseases of blood vessels such as a coronary artery and to formulate a treatment plan.

(First modification example of first embodiment) In the first embodiment described above, at Step S104, the explanation is given about the case in which, at the time of calculating the WSS exerted on the plaque 12 at the timing $T_N$, the calculation function 155c uses the shape of the blood vessel 11 at the timing $T_0$. Thus, in the first embodiment, during the analysis operation, the shape of the blood vessel 11 remains unchanged. However, alternatively, the calculation function 155c can also correct the shape of the blood vessel 11. Then, using the corrected shape of the blood vessel 11 at the timing $T_N$, the calculation function 155c can calculate the WSS exerted on the plaque 12 at the timing $T_N$.

Such a modification example is explained as a first modification example of the first embodiment. In the first modification example of the first embodiment, the explanation is mainly given about the differences with the first embodiment. Thus, regarding the configuration identical to the first embodiment, the explanation is not given. For example, in the explanation of the first modification example of the first embodiment, the configuration identical to the first embodiment is referred to by the same reference numerals, and the explanation thereof is not given again.

Figure 7:
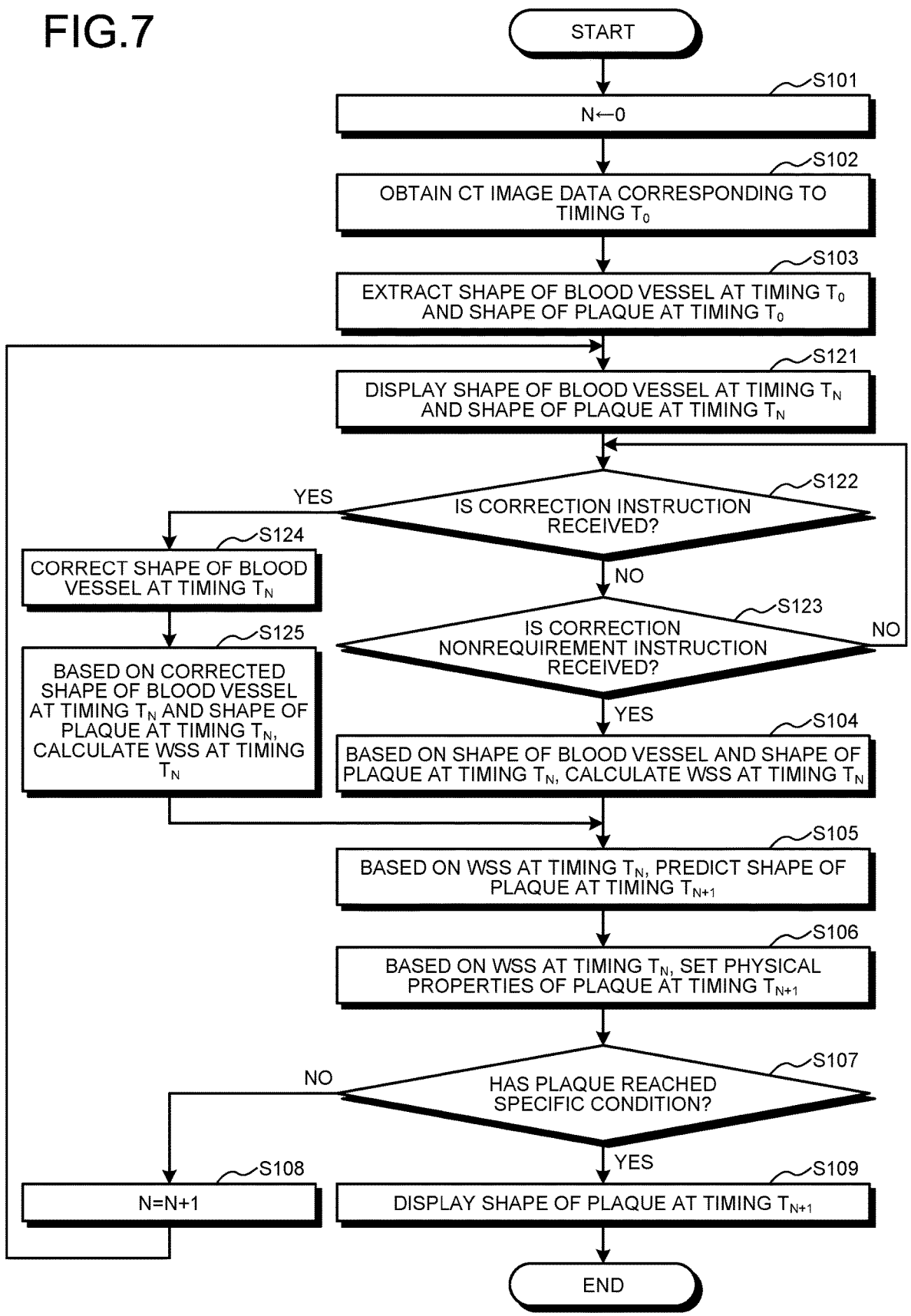
FIG. 7 is a flowchart for explaining an exemplary flow of an analysis operation performed in the analysis device according to a first modification example of the first embodiment.

FIG. 7 is a flowchart for explaining an exemplary flow of an analysis operation performed in the analysis device 150 according to the first modification example of the first embodiment. As compared to the analysis operation illustrated in FIG. 2 according to the first embodiment, the analysis operation illustrated in FIG. 7 according to the first modification example of the first embodiment differs in the way that the operations from Step S121 to Step S125 are performed in between the operations performed at Steps S103 and S104 as well as in between the operations performed at Steps S108 and S104.

As illustrated in FIG. 7, after the operation at either Step S103 or Step S108 is performed, the display control function 155e displays, in the display 154, the shape of the blood vessel 11 at the timing $T_N$ and the shape of the plaque 12 at the timing $T_N$ (Step S121).

Then, the calculation function 155c determines whether or not the input interface 153 has received a correction instruction that is input by the user and that instructs correction of the shape of the blood vessel 11 at the timing $T_N$ (Step S122).

If the input interface 153 has not received a correction instruction (No at Step S122), then the calculation function 155c determines whether or not the input interface 153 has received a correction nonrequirement instruction that is input by the user as an instruction indicating that there is no need to correct the shape of the blood vessel 11 at the timing $T_N$ (Step S123). If the input interface 153 has received a correction nonrequirement instruction (Yes at Step S123), then the system control proceeds to Step S104 and the calculation function 155c performs the operation at Step S104.

In the first modification example of the first embodiment, at Step S104, if the value of the variable N is equal to "0"; then, based on the shape of the blood vessel at the timing $T_0$ and the shape of plaque 12 at the timing $T_0$, the calculation function 155c calculates the WSS exerted on the plaque 12 at the timing $T_0$. Moreover, at Step S104, if the value of the variable N is equal to "k" (where k is an integer equal to or greater than "1"); then, based on the shape of the blood vessel at the timing $T_k$ and the shape of plaque 12 at the timing $T_k$, the calculation function 155c calculates the WSS exerted on the plaque 12 at the timing $T_k$. Herein, the shape of the blood vessel 11 at the timing $T_k$ implies, for example, the shape of the blood vessel 11 that corresponds to the timing $T_{k-1}$ and that was used by the calculation function 155c at Step S104 or Step S125 in calculating the WSS exerted on the plaque 12 at the timing $T_{k-1}$.

Meanwhile, if the input interface 153 has not received a correction nonrequirement instruction (No at Step S123), then the system control returns to Step S122 and the calculation function 155c again performs the operation at Step S122.

Meanwhile, if the input interface has received a correction instruction (Yes at Step S122), then the calculation function 155c corrects the shape of the blood vessel 11 at the timing $T_N$ based on the correction instruction (Step S124).

Subsequently, based on the corrected shape of the blood vessel 11 at the timing $T_N$ and the shape of the plaque 12 at the timing $T_N$, the calculation function 155c calculates the WSS exerted on the plaque 12 at the timing $T_N$ (Step S125). When the system control proceeds from Step S125 to Step S105; based on the WSS calculated at Step S125, the calculation function 155c predicts, at Step S105, the shape of the plaque 12 at the timing $T_{N+1}$.

Moreover, in the first modification example of the first embodiment, the explanation is given about the case in which the system control returns from Step S108 to Step S121. In that case, at Step S121, the shape of the blood vessel 11 at the timing $T_{N-1}$ that was used in calculating the WSS exerted on the plaque 12 at the timing $T_{N-1}$ is treated as the shape of the blood vessel 11 at the timing $T_N$, and the display control function 155e displays, in the display 154, the shape of the blood vessel 11 at the timing $T_N$ and the shape of the plaque 12 at the timing $T_N$.

In the analysis operation illustrated in FIG. 7, the explanation is given about the case in which the calculation function 155c corrects the shape of the blood vessel 11 at the timing $T_N$ that is used in calculating the WSS. At the time of calculating the WSS, the parameters related to the blood flowing into the blood vessel 11 and the parameters related to the blood flowing away from the blood vessel 11 are also used. In that regard, in an identical manner to the method for correcting the shape of the blood vessel 11 at the timing $T_N$, the calculation function 155c can correct the parameters related to the blood flowing into the blood vessel 11 and the parameters related to the blood flowing away from the blood vessel 11. The parameters related to the blood flowing into the blood vessel 11 represent an example of first-type parameters, and the parameters related to the blood flowing away from the blood vessel 11 represent an example of second-type parameters.

That is, the input interface 153 receives at least one of the following instructions: an instruction to correct the shape of the blood vessel 11 at the timing $T_N$; an instruction to correct the parameters related to the blood flowing into the blood vessel 11; and an instruction to correct the parameters related to the blood flowing away from the blood vessel 11. Then, based on at least either the corrected shape of the blood vessel 11 at the timing $T_N$, or the corrected parameters related to the blood flowing into the blood vessel 11, or the corrected parameters related to the blood flowing away from the blood vessel 11 obtained as a result of performing correction according to the at least one instruction received by the input interface 153; the calculation function 155c calculates the WSS exerted on the plaque 12 at the timing $T_N$.

Till now, the explanation was given about the analysis device 150 and the analysis system 100 according to the first modification example of the first embodiment. According to the first modification example of the first embodiment, if the shape of the blood vessel 11 used in calculating the WSS exerted on the plaque 12 is not a precise shape, the user corrects the shape of the blood vessel 11 to the precise shape thereby enabling accurate calculation of the WSS. In an identical manner, if the values of various parameters used in calculating the WSS exerted on the plaque 12 are not precise values, the user corrects the values of the parameters to precise values thereby enabling accurate calculation of the WSS.

(Second modification example of first embodiment)

Meanwhile, at Step S105, the prediction function 155d can predict the shape of the plaque 12 at the timing $T_{N+1}$ according to a different method other than the method explained earlier in the first embodiment. For example, the plaque 12 is a relatively soft object. Hence, it is believed that the plaque 12 undergoes deformation due to the force (pressure) exerted from the blood flow. In that regard, at the time of predicting the shape of the plaque 12, the prediction function 155d can ensure that the plaque 12 is deformed based on the force exerted from the blood flow.

Such a modification example is explained as a second modification example of the first embodiment.

Meanwhile, in the explanation of the second modification example of the first embodiment, the explanation is mainly given about the differences with the first embodiment. Thus, regarding the configuration identical to the first embodiment, the explanation is not given. For example, in the explanation of the second modification example of the first embodiment, the configuration identical to the first embodiment is referred to by the same reference numerals, and the explanation thereof is not given again.

Figure 8:
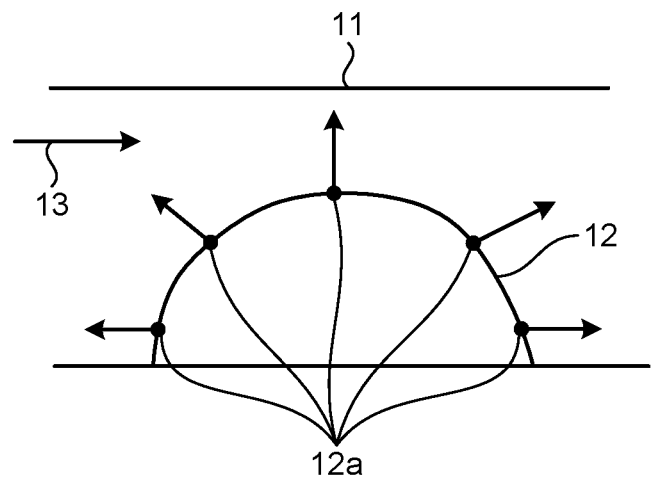
FIGS. 8 and 9 are diagrams for explaining examples of the operations performed in the analysis device according to a second modification example of the first embodiment.
Figure 9:
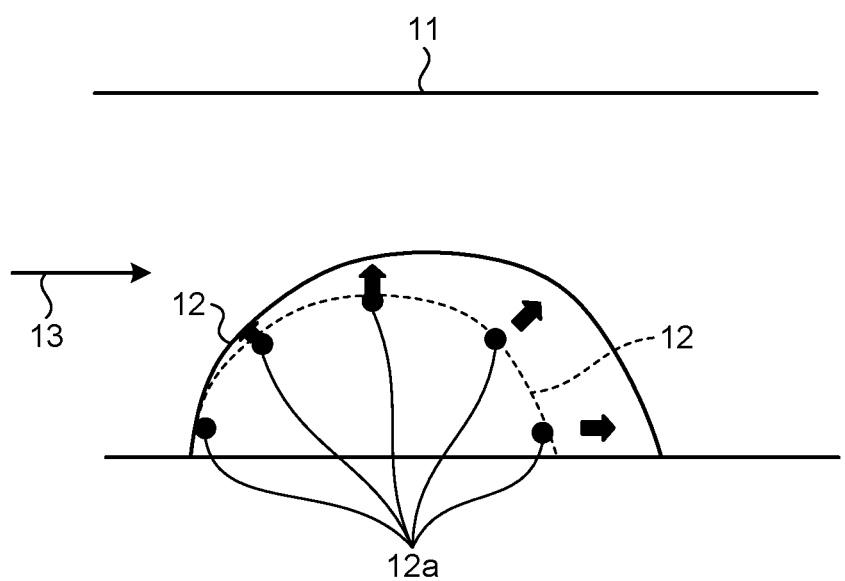

Explained below with reference to FIGS. 8 and 9 is a method by which the prediction function 155d according to the second modification example of the first embodiment predicts the shape of the plaque 12 at the timing FIGS. 8 and 9 are diagrams for explaining examples of the operations performed in the analysis device 150 according to the second modification example of the first embodiment.

If the magnitude of the WSS falls below the first threshold value α, or if the magnitude of the WSS falls below the first threshold value α and if the maximum value of the difference in the WSS in one pulsation exceeds the second threshold value β; then the prediction function 155d calculates the angle made by the normal direction of each of a plurality of positions 12a on the outer surface of the plaque 12 corresponding to the timing $T_N$ with the direction of blood flow in the blood vessel 11 as illustrated by an arrow 13 in FIG. 8. For example, regarding each position 12a, the prediction function 155d calculates the angle in the range from 0° to 180°.

In the example illustrated in FIG. 8, from among the five positions 12a, the normal direction of the leftmost position 12a makes an angle of 180° with the direction of blood flow illustrated by the arrow 13. Moreover, from among the five positions 12a illustrated in FIG. 8, the normal direction of the centermost position 12a in the horizontal direction makes an angle of 90° with the direction of blood flow illustrated by the arrow 13. Furthermore, from among the five positions 12a illustrated in FIG. 8, the normal direction of the rightmost position 12a makes an angle of 0° with the direction of blood flow illustrated by the arrow 13.

Herein, the force exerted from the blood flow on any position 12a decreases or increases in proportion with the angle. Hence, the growth of the portion of each position 12a is accelerated or suppressed in inverse proportion to the angle.

In that regard, as illustrated in FIG. 9, the prediction function 155d enlarges the shape of the plaque 12 in the normal direction of each position 12a by the size that is in accordance with the corresponding angle. Then, as the shape of the plaque at the timing $T_{N+1}$, the prediction function 155d predicts the shape of the plaque 12 obtained in the manner explained above. Herein, the size that is in accordance with the angle implies that, for example, the size increases with a decrease in the angle, and the size decreases with an increase in the angle. Thus, according to the second modification example of the first embodiment, the prediction function 155d can predict the manner of deformation of the plaque 12 due to the force exerted from the blood flow.

Till now, the explanation was given about the analysis device 150 and the analysis system 100 according to the second modification example of the first embodiment. In the second modification example of the first embodiment, as explained above, in the normal direction of each of a plurality of positions 12a on the outer surface of the plaque 12 corresponding to the timing $T_N$, the prediction function 155d enlarges the shape of the plaque 12 by the size that is in accordance with the angle made by the normal direction of the concerned position 12a with the direction of blood flow inside the blood vessel 11; and accordingly predicts the shape of the plaque 12 at the timing Hence, according to the second modification example of the first embodiment, as explained above, it becomes possible to predict the manner of deformation of the plaque 12 due to the force exerted from the blood flow.

Meanwhile, the method for predicting the manner of deformation of the plaque 12 due to the force exerted from the blood flow is not limited to the method explained above. Given below is the explanation of another method for predicting the manner of deformation of the plaque 12 due to the force exerted from the blood flow.

For example, in an identical manner to the first embodiment, as illustrated in FIG. 4, in the normal direction of each position 12a on the outer surface of the plaque 12 corresponding to the timing $T_N$, the prediction function 155d enlarges the shape of the plaque 12 by a predetermined size from each position 12a.

Then, the prediction function 155d performs fluid structure interaction simulation and predicts the manner of deformation of the plaque 12 when the pressure of the blood flow gets exerted on the plaque 12. For example, firstly, the prediction function 155d defines the spatial distribution of the softness of the plaque 12. For example, the prediction function 155d obtains the distribution of the CT values of the plaque 12 from the CT image data 152a. Then, based on the distribution of the CT values of the plaque 12, the prediction function 155d defines the spatial distribution of the softness of the plaque 12.

Subsequently, based on the magnitude and the orientation of the pressure exerted on each position 12a of the plaque 12 due to the blood flow as well as based on the shape of the plaque 12 and the spatial distribution of the softness of the plaque 12, the prediction function 155d simulates the manner of deformation of the plaque 12 and obtains the post-deformation shape of the plaque 12.

Then, the prediction function 155d predicts the obtained shape of the plaque 12 as the shape of the plaque 12 at the timing $T_{N+1}$.

Second Embodiment

In the first embodiment, the explanation is given about the case in which the analysis device 150 uses the timing at which the growth of the plaque 12 has ended as the timing at which the plaque 12 reaches the specific condition.

Moreover, in the first embodiment, the explanation is given about the case in which the analysis device 150 predicts the shape of the plaque 12 at the timing at which the growth of the plaque 12 has ended, and displays the predicted shape of the plaque 12. However, as the timing at which the plaque 12 reaches the specific condition, the analysis device 150 can use the timing at which the plaque 12 grows to cause a risk to the subject. Then, the analysis device 150 can predict the shape of the plaque 12 at the timing at which the plaque 12 would reach the condition of causing a risk to the subject, and display the predicted shape of the plaque 12. That explanation is given below as a second embodiment.

In the second embodiment, the explanation is mainly given about the differences with the first embodiment. Thus, regarding the configuration identical to the first embodiment, the explanation is not given. For example, in the explanation of the second embodiment, the configuration identical to the first embodiment is referred to by the same reference numerals, and the explanation thereof is not given again.

Figure 10:
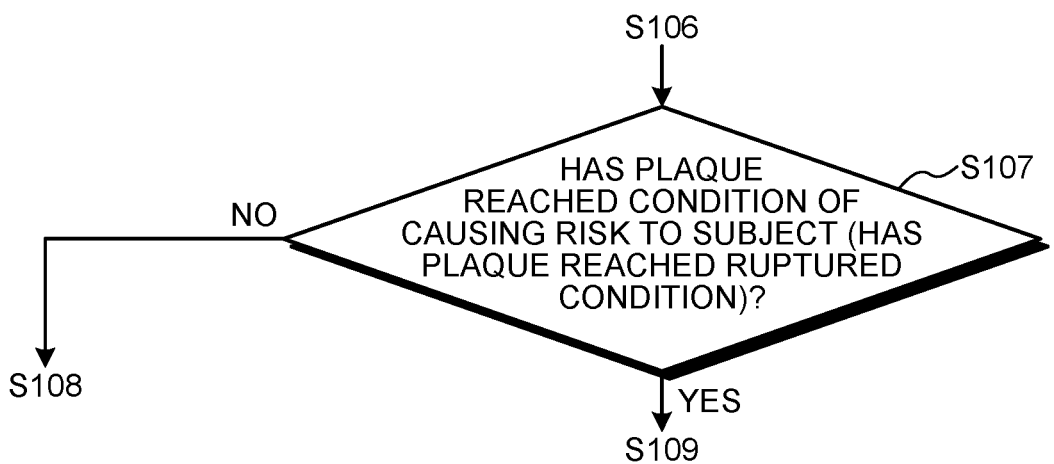
FIG. 10 is a diagram for explaining an example of the operations performed in the analysis device according to a second embodiment.

FIG. 10 is a diagram for explaining an example of the operations performed in the analysis device 150 according to the second embodiment. For example, in the second embodiment, at Step S107, as illustrated in FIG. 10, the calculation function 155c determines whether or not the plaque 12 would reach the condition of causing a risk to the subject at the timing More particularly, at Step S107, the calculation function 155c determines whether or not the plaque reaches the ruptured condition at the timing $T_{N+1}$.

Given below is the explanation of a specific example of the operation performed at Step S107. For example, the calculation function 155c calculates the fluid force exerted on the plaque 12. Then, from the shape of the plaque 12 and the physical properties (for example, the softness) of the plaque 12), the calculation function 155c determines that the plaque 12 reaches the ruptured condition when the force of a certain level or more gets exerted thereon. On the other hand, if the force exerted on the plaque 12 is lower than a certain level, then the calculation function 155c determines that the plaque 12 does not reach the ruptured condition. Meanwhile, the calculation function 155c can use the rupture dynamics and determine whether or not the plaque 12 would reach the ruptured condition.

When the plaque 12 is determined to reach the ruptured condition, the calculation function 155c determines that the plaque 12 would cause a risk to the subject. When the plaque 12 is determined not to reach the ruptured condition, the calculation function 155c determines that the plaque 12 would not cause a risk to the subject.

If the plaque 12 would reach the condition of causing a risk to the subject (Yes at Step S107), then the system control proceeds to Step S109 and the display control function 155e performs the operation at Step S109. On the other hand, if the plaque 12 would not reach the condition of causing a risk to the subject (No at Step S107), then the system control proceeds to Step S108 and the calculation function 155c performs the operation at Step S108.

Thus, in the second embodiment, until the plaque 12 would reach the condition of causing a risk to the subject, every time the timing $T_k$ is derived, the calculation function 155c calculates the WSS exerted on the plaque 12 at the timing $T_k$. Then, until the plaque 12 would reach the condition of causing a risk to the subject, every time the WSS exerted on the plaque 12 at the timing $T_k$ is calculated, the prediction function 155d predicts the shape of the plaque 12 at the timing $T_{k+1}$ that is the next timing to the timing $T_k$ based on the calculated WSS. Subsequently, the display control function 155e displays, in the display 154, the shape of the plaque 12 corresponding to the timing $T_{k+1}$ at which the plaque 12 would reach the condition of causing a risk to the subject.

More particularly, until the plaque 12 reaches the ruptured condition, every time the timing $T_k$ is derived, the calculation function 155c calculates the WSS exerted on the plaque 12 at the timing $T_k$. Then, until the plaque 12 reaches the ruptured condition, every time the WSS exerted on the plaque 12 at the timing $T_k$ is calculated, the prediction function 155d predicts the shape of the plaque 12 at the timing $T_{k+1}$ that is next timing to the timing $T_k$ based on the calculated WSS. Subsequently, the display control function 155e displays, in the display 154, the shape of the plaque 12 corresponding to the timing $T_{k+1}$ at which the plaque 12 reaches the ruptured condition.

Till now, the explanation was given about the analysis device 150 and the analysis system 100 according to the second embodiment. According to the second embodiment, it becomes possible to predict that the plaque 12 would reach the condition of causing a risk to the subject in the relatively distant future. Moreover, it becomes possible to predict that the plaque 12 would reach the ruptured condition in the relatively distant future.

Moreover, according to the second embodiment, it becomes possible for the user, such as a doctor, to confirm the fact that the plaque 12 would reach the condition of causing a risk to the subject in the relatively distant future. Furthermore, according to the second embodiment, it becomes possible for the user, such as a doctor, to confirm the fact that the plaque 12 would reach the ruptured condition in the relatively distant future. As a result, it becomes possible to support the user, such as a doctor, to perform diagnosis related to the diseases of blood vessels such as a coronary artery and to formulate a treatment plan.

Third Embodiment

In the second embodiment described above, the explanation is given for the case in which the analysis device 150 treats the timing of rupturing of the plaque 12 as the timing at which the plaque 12 would reach the condition of causing a risk to the subject. Moreover, in the second embodiment, the explanation is given about the case in which the analysis device 150 predicts the shape of the plaque 12 at the timing of rupturing of the plaque 12, and displays the predicted shape of the plaque 12. However, alternatively, as the timing at which the plaque 12 would reach the condition of causing a risk to the subject, the analysis device 150 can treat the timing at which the plaque 12 blocks the blood flow inside the blood vessel 11. Then, the analysis device 150 can predict the shape of the plaque at the timing at which the plaque 12 blocks the blood flow inside the blood vessel 11, and display the predicted shape of the plaque 12. That explanation is given below as a third embodiment.

In the third embodiment, the explanation is mainly given about the differences with the first embodiment. Thus, regarding the configuration identical to the first embodiment, the explanation is not given. For example, in the explanation of the third embodiment, the configuration identical to the first embodiment is referred to by the same reference numerals, and the explanation thereof is not given again.

Figure 11:
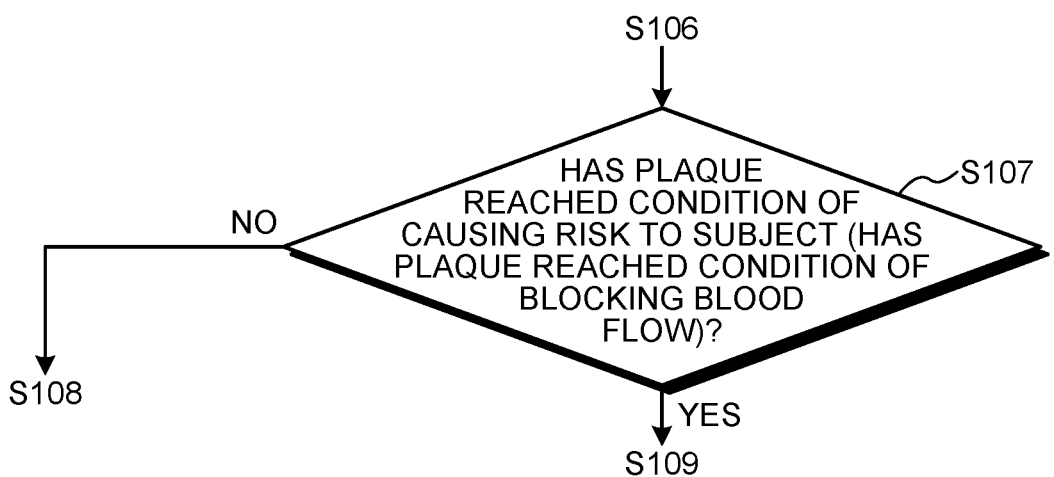
FIG. 11 is a diagram for explaining an example of the operations performed in the analysis device according to a third embodiment.

FIG. 11 is a diagram for explaining an example of the operations performed in the analysis device 150 according to the third embodiment. For example, in the third embodiment, at Step S107, as illustrated in FIG. 11, the calculation function 155c determines whether or not the plaque 12 would reach the condition of causing a risk to the subject at the timing More particularly, at Step S107, the calculation function 155c determines whether or not the plaque reaches the condition of blocking the blood flow inside the blood vessel 11 at the timing $T_{N+1}$.

Given below is the explanation of a specific example of the operation performed at Step S107. For example, the calculation function 155c calculates the fractional flow reserve (FFR) inside the blood vessel at the timing $T_N$. For example, the calculation function 155c calculates the FFR using a known technology for FFR calculation. For example, the calculation function 155c calculates the FFR at the timing $T_N$ based on the shape of the blood vessel 11 at the timing $T_0$, the shape of the plaque 12 at the timing $T_N$, the parameters related to the blood flow into the blood vessel 11, and the parameters related to the blood flow away from the blood vessel 11.

Then, the calculation function 155c determines whether or not the value of the FFR at the timing $T_N$ is smaller than a predetermined value (for example, 0.85). If the value of the FFR at the timing $T_N$ is smaller than the predetermined value, then the calculation function 155c determines that the plaque 12 would reach the condition of blocking the blood vessel inside the blood vessel 11 at the timing $T_{N+1}$. On the other hand, if the value of the FFR at the timing $T_N$ is equal to or greater than the predetermined value, then the calculation function 155c determines that the plaque 12 would not reach the condition of blocking the blood flow inside the blood vessel 11 at the timing $T_{N+1}$.

If the plaque 12 is determined to reach the condition of blocking the blood vessel inside the blood vessel 11, then the calculation function 155c determines that the plaque 12 would reach the condition of causing a risk to the subject. On the other hand, if the plaque 12 is determined to not reach the condition of blocking the blood vessel inside the blood vessel 11, then the calculation function 155c determines that the plaque 12 would not reach the condition of causing a risk to the subject.

If the plaque 12 would reach the condition of causing a risk to the subject (Yes at Step S107), then the system control proceeds to Step S109 and the display control function 155e performs the operation at Step S109. On the other hand, if the plaque 12 would not reach the condition of causing a risk to the subject (No at Step S107), then the system control proceeds to Step S108 and the calculation function 155c performs the operation at Step S108.

Thus, in the third embodiment, until the plaque 12 would reach the condition of blocking the blood flow inside the blood vessel 11, every time the timing $T_k$ is derived, the calculation function 155c calculates the WSS exerted on the plaque 12 at the timing $T_k$. Then, until the plaque 12 would reach the condition of blocking the blood flow inside the blood vessel 11, every time the WSS exerted on the plaque 12 at the timing $T_k$ is calculated, the prediction function 155d predicts the shape of the plaque 12 at the timing $T_{k+1}$ that is the next timing to the timing $T_k$ based on the calculated WSS. Subsequently, the display control function 155e displays, in the display 154, the shape of the plaque 12 corresponding to the timing $T_{k+1}$ at which the plaque 12 would reach the condition of blocking the blood flow inside the blood vessel 11.

Till now, the explanation was given about the analysis device 150 and the analysis system 100 according to the third embodiment. According to the third embodiment, it becomes possible to predict that the plaque 12 would reach the condition of causing a risk to the subject in the relatively distant future. Moreover, it becomes possible to predict that the plaque 12 would reach the condition of blocking the blood flow inside the blood vessel 11 in the relatively distant future.

Moreover, according to the third embodiment, it becomes possible for the user, such as a doctor, to confirm the fact about the arrival of the plaque 12 to the condition of causing a risk to the subject in the relatively distant future. Furthermore, according to the third embodiment, it becomes possible for the user, such as a doctor, to confirm the fact about the arrival of the plaque 12 to the condition of blocking the blood flow inside the blood vessel 11 in the relatively distant future. As a result, it becomes possible to support the user, such as a doctor, to perform diagnosis related to the diseases of blood vessels such as a coronary artery and to formulate a treatment plan.

Fourth Embodiment

In the first embodiment, the explanation is given about the case in which, when a stent has not been placed inside the blood vessel 11 for treatment purposes, the shape of the plaque 12 is predicted for the timing $T_{N+1}$ at which the plaque 12 reaches the specific condition. However, also when a stent has been placed inside the blood vessel 11, the analysis device 150 can predict the shape of the plaque 12 at the timing $T_{N+1}$ at which the plaque 12 reaches the specific condition. Then, the analysis device 150 can display the shape of the plaque 12 as predicted when a stent has not been placed in the blood vessel 11 and can display the shape of the plaque 12 as predicted when a stent has been placed in the blood vessel 11. That explanation is given below as a fourth embodiment.

In the fourth embodiment, the explanation is mainly given about the differences with the first embodiment. Thus, regarding the configuration identical to the first embodiment, the explanation is not given. For example, in the explanation of the fourth embodiment, the configuration identical to the first embodiment is referred to by the same reference numerals, and the explanation thereof is not given again.

In the fourth embodiment, in an identical manner to the first embodiment, firstly, in the state in which a stent has not been placed inside the blood vessel 11, the analysis device 150 predicts the shape of the plaque 12 at the timing $T_{N+1}$ at which the plaque 12 reaches the specific condition. In the following explanation according to the fourth embodiment, "the state in which a stent has not been placed" is termed as a "first state". For example, the analysis device 150 performs the operations from Step S101 to S108 illustrated in FIG. 2, and predicts the shape of the plaque 12 at the timing $T_{N+1}$, at which the plaque 12 reaches the specific condition, in the first state.

Figure 12:
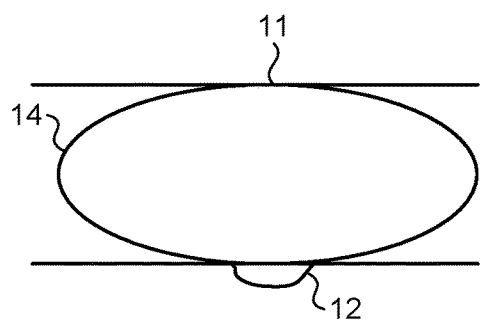
FIGS. 12 and 13 are diagrams for explaining examples of the operations performed in the analysis device according to a fourth embodiment.

FIG. 12 is a diagram for explaining an example of the operations performed in the analysis device 150 according to the fourth embodiment. In FIG. 12 is illustrated an example in which stent treatment has been performed. As illustrated in FIG. 12, the narrowed portion of the blood vessel 11 that was narrowed due to the plaque 12 is widened by a stent 14. Moreover, in the state in which the stent 14 has been placed inside the blood vessel 11 as illustrated in FIG. 12, the analysis device 150 predicts the shape of the plaque 12 at the timing $T_{N+1}$ at which the plaque 12 reaches the specific condition. In the following explanation of the fourth embodiment, "the state in which the stent 14 has been placed inside the blood vessel 11" is termed as a "second state". For example, the analysis device 150 performs the operations from Step S101 to S108 illustrated in FIG. 2, and predicts the shape of the plaque 12 at the timing $T_{N+1}$, at which the plaque 12 reaches the specific condition, in the second state. Herein, at Step S104, the calculation function 155c calculates the WSS exerted on the plaque 12 at the timing $T_N$ based on the shape of the blood vessel 11 at the timing $T_0$, the shape of the plaque 12 at the timing $T_N$, and the shape of the stent 14. Meanwhile, during the analysis operation, the shape of the stent 14 remains unchanged at all points of time.

Figure 13:
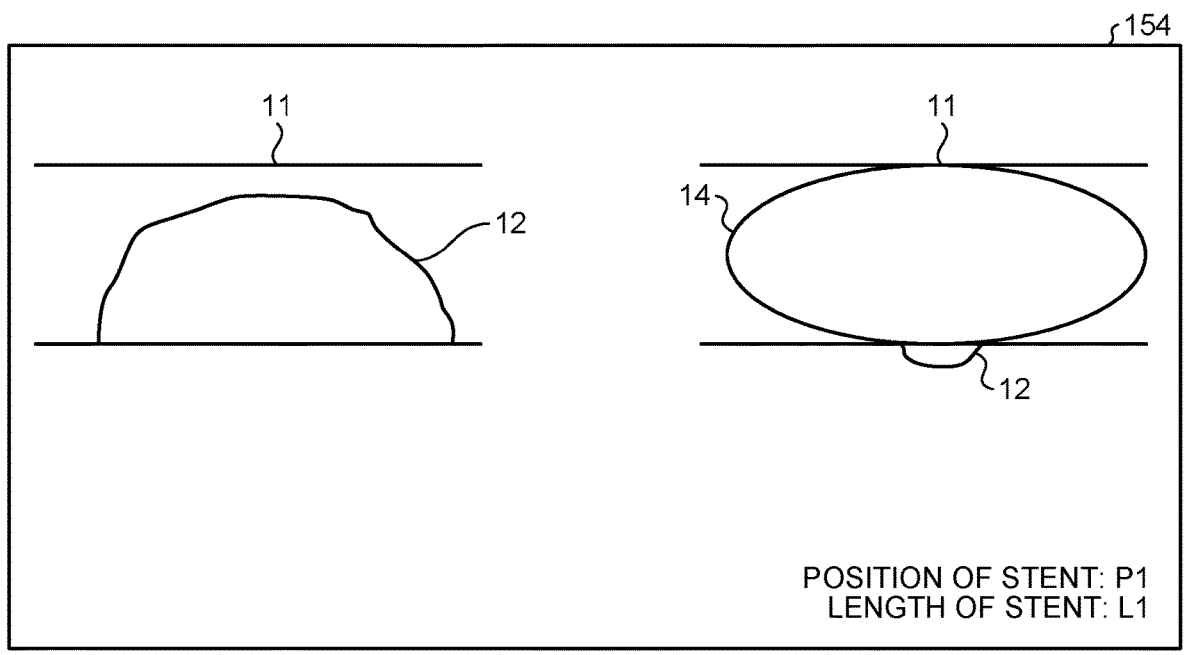

FIG. 13 is a diagram for explaining an example of the operations performed in the analysis device 150 according to the fourth embodiment. As illustrated in FIG. 13, the display control function 155e displays the following shapes side-by-side in the display 154: the shape of the plaque 12 at the timing $T_{N+1}$, at which the plaque 12 reaches the specific condition, in the first state; and the shape of the plaque 12 at the timing $T_{N+1}$, at which the plaque 12 reaches the specific condition, in the second state. As a result, it becomes possible for the user, such as a doctor, to confirm the prediction result about the shape of the plaque 12 when stent treatment is performed using the stent 14, and to confirm the prediction result about the shape of the plaque 12 when stent treatment is not performed. Hence, it becomes possible to support the user, such as a doctor, to perform diagnosis related to the diseases of blood vessels such as a coronary artery and to formulate a treatment plan.

Moreover, as illustrated in FIG. 13, the display control function 155e displays a position "P1" of the stent 14 and a length "L1" of the stent 14 in the display 154. As a result, it becomes possible for the user, such as a doctor, to confirm the position and the length of the stent 14 used in stent treatment. Thus, from that perspective too, it becomes possible to support the user, such as a doctor, to perform diagnosis related to the diseases of blood vessels such as a coronary artery and to formulate a treatment plan.

Moreover, the display control function 155e can also display, in the display 154, the timing $T_{N+1}$ at which the plaque 12 reaches the specific condition in the first state and the timing $T_{N+1}$ at which the plaque 12 reaches the specific condition in the second state. The timing $T_{N+1}$ at which the plaque 12 reaches the specific condition in the first state may or may not be same as the timing $T_{N+1}$ at which the plaque 12 reaches the specific condition in the second state. Thus, the user, such as a doctor, becomes able to confirm, in the first state as well as in the second state, the timing at which the plaque 12 reaches the specific condition. From that perspective too, it becomes possible to support the user, such as a doctor, to perform diagnosis related to the diseases of blood vessels such as a coronary artery and to formulate a treatment plan.

Meanwhile, in the fourth embodiment, the timing at which the plaque 12 reaches the specific condition represents, for example, the timing at which the growth of the plaque 12 has ended, or the timing at which the plaque 12 reaches the condition of causing a risk to the subject (for example, the timing at which the plaque 12 ruptures or the timing at which the plaque 12 blocks the blood flow inside the blood vessel 11).

In the fourth embodiment, the timing at which the plaque 12 reaches the specific condition can be, for example, a specific timing arriving after a predetermined period of time (for example, a few years) since the timing $T_0$. That specific timing represents an example of a third-type timing.

Till now, the explanation was given about an exemplary configuration of the analysis device 150 and the analysis system 100 according to the fourth embodiment. According to the fourth embodiment, as explained above, it becomes possible to support the user, such as a doctor, to perform diagnosis related to the diseases of blood vessels such as a coronary artery and to formulate a treatment plan.

Fifth Embodiment

In the fourth embodiment, the explanation is given about the case in which the analysis device 150 displays the prediction result about the shape of the plaque 12 when stent treatment is performed using the stent 14, and displays the prediction result about the shape of the plaque 12 when stent treatment is not performed. Alternatively, the analysis device 150 can display the shape of the plaque 12 as predicted in each of a plurality of states in which the stent 14 is placed inside the blood vessel 11, with at least either the position or the length of the placed stent 14 being different from each other. That explanation is given below as a fifth embodiment.

In the fifth embodiment, the explanation is mainly given about the differences with the fourth embodiment. Thus, regarding the configuration identical to the fourth embodiment, the explanation is not given. For example, in the explanation of the fifth embodiment, the configuration identical to the fourth embodiment is referred to by the same reference numerals, and the explanation thereof is not given again.

In the fifth embodiment, in each of a plurality of states in which the stent 14 is placed inside the blood vessel 11, the analysis device 150 predicts the shape of the plaque at the timing $T_{N+1}$, at which the plaque 12 reaches the specific condition, according to the same method as implemented in the fourth embodiment. In those plurality of states, the stent 14 placed inside the blood vessel 11 has at least either different positions or different lengths. The following explanation is given about two states representing the plurality of states. However, there can be three or more states as well.

For example, the explanation is given about the following two examples: the state in which the stent 14 having a length "L2" is placed at a position "P2" inside the blood vessel 11; and the state in which the stent 14 having a length "L3" is placed at a position "P3" inside the blood vessel 11. In that case, in each of those two states, the analysis device 150 predicts the shape of the plaque 12 at the timing $T_{N+1}$ at which the plaque 12 reaches the specific condition.

In the following explanation of the fifth embodiment, "the state in which the stent 14 having the length "L2" is placed at the position "P2" inside the blood vessel 11" is termed as a "first state". Moreover, in the following explanation of the fifth embodiment, "the state in which the stent 14 having the length "L3" is placed at the position "P3" inside the blood vessel 11" is termed as a "second state".

Figure 14:
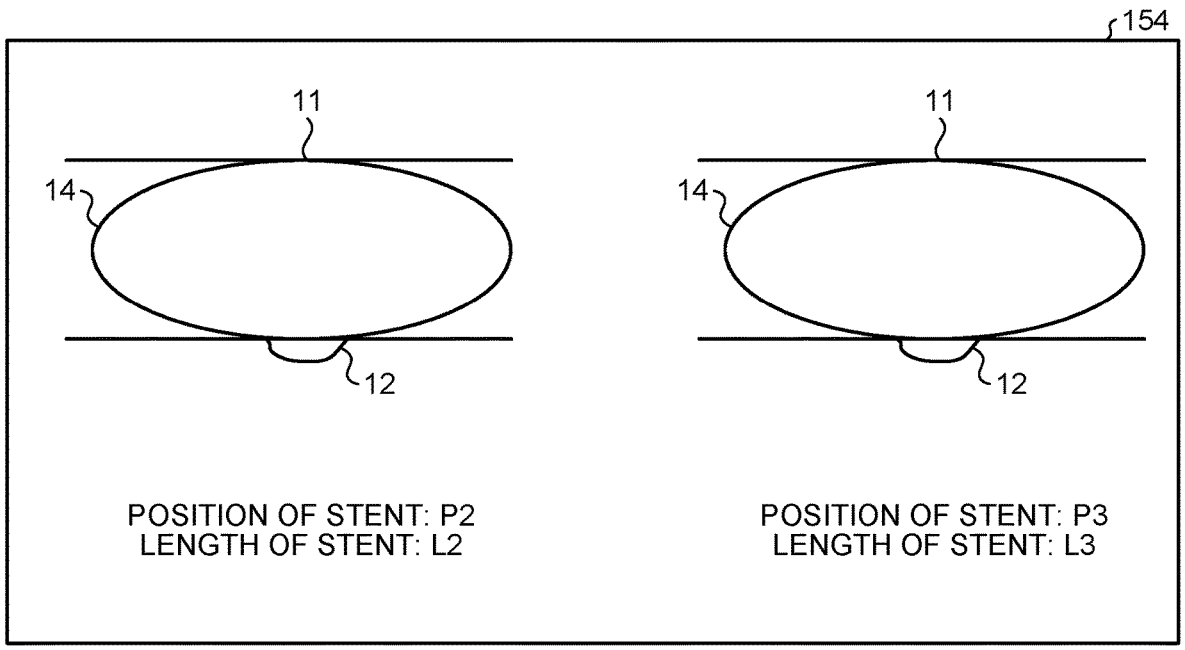
FIG. 14 is a diagram for explaining an example of the operations performed in the analysis device according to a fifth embodiment.

FIG. 14 is a diagram for explaining an example of the operations performed in the analysis device 150 according to the fifth embodiment. As illustrated in FIG. 14, the display control function 155e displays the following shapes side-by-side in the display 154: the shape of the plaque 12 at the timing $T_{N+1}$, at which the plaque 12 reaches the specific condition, in the first state; and the shape of the plaque 12 at the timing $T_{N+1}$, at which the plaque 12 reaches the specific condition, in the second state. The timing $T_{N+1}$ at which the plaque 12 reaches the specific condition in the first state may or may not be same as the timing $T_{N+1}$ at which the plaque 12 reaches the specific condition in the second state. As a result, it becomes possible for the user, such as a doctor, to confirm the prediction result about the shape of the plaque 12 when stent treatment in the first state is performed, and to confirm the prediction result about the shape of the plaque 12 when stent treatment in the second state is performed. As a result, it becomes possible to support the user, such as a doctor, to perform diagnosis related to the diseases of blood vessels such as a coronary artery and to formulate a treatment plan.

Moreover, as illustrated in FIG. 14, the display control function 155e displays, in the display 154, the position "P2"

and the length "L2" of the stent 14 as well as the position "P3" and the length "L3" of the stent 14.

In the fifth embodiment, the timing at which the plaque 12 reaches the specific condition can be, for example, a specific timing after a predetermined period of time (for example, a few years) since the timing $T_0$. That specific timing represents an example of the third-type timing. In that case, from among a plurality shapes of the plaque 12 at the specific timing, the display control function 155e can display, in the display 154, the shape of the plaque 12 that does not cause a risk to the subject.

Till now, the explanation was given about an exemplary configuration of the analysis device 150 and the analysis system 100 according to the fifth embodiment. According to the fifth embodiment, as explained above, it becomes possible to support the user, such as a doctor, to perform diagnosis related to the diseases of blood vessels such as a coronary artery and to formulate a treatment plan.

Sixth Embodiment

In the first embodiment, the subject is not administered with a medicine, such as statin or PCSK9 inhibitor, meant for lowering the cholesterol value in the blood. Hence, in the first embodiment, the explanation is given about the case in which, without administration of a medicine, the shape of the plaque 12 is predicted for the timing $T_{N+1}$ at which the plaque 12 reaches the specific condition. However, also in the state in which the abovementioned medicine is administered to the subject, the analysis device 150 can predict the shape of the plaque 12 at the timing $T_{N+1}$ at which the plaque 12 reaches the specific condition. Then, the analysis device 150 can display the shape of the plaque 12 as predicted when no medicine is administered to the subject and can display the shape of the plaque 12 as predicted when a medicine is administered to the subject. That explanation is given below as a sixth embodiment.

In the sixth embodiment, the explanation is mainly given about the differences with the first embodiment. Thus, regarding the configuration identical to the first embodiment, the explanation is not given. For example, in the explanation of the sixth embodiment, the configuration identical to the first embodiment is referred to by the same reference numerals, and the explanation thereof is not given again.

In the sixth embodiment, in an identical manner to the first embodiment, firstly, in the state in which no medicine is administered to the subject, the analysis device 150 predicts the shape of the plaque 12 at the timing $T_{N+1}$ at which the plaque 12 reaches the specific condition. In the following explanation of the sixth embodiment, "the state in which no medicine is administered to the subject" is termed as a "first state". For example, the analysis device 150 performs the operations from Step S101 to Step S108, and predicts the shape of the plaque 12 at the timing $T_{N+1}$, at which the plaque 12 reaches the specific condition, in the first state.

Moreover, in the state in which a medicine is administered to the subject, the analysis device 150 predicts the shape of the plaque 12 at the timing $T_{N+1}$ at which the plaque 12 reaches the specific condition. In the following explanation of the sixth embodiment, "the state in which a medicine is administered to the subject" is termed as a "second state". For example, the analysis device 150 performs the operations identical to the operations from Step S101 to Step S108, and predicts the shape of the plaque 12 at the timing $T_{N+1}$, at which the plaque 12 reaches the specific condition, in the second state. Herein, at Step S105, at the time of predicting the shape of the plaque 12, the prediction function 155d takes into account the impact attributed to the type of the medicine and the dosage amount.

Figure 15:
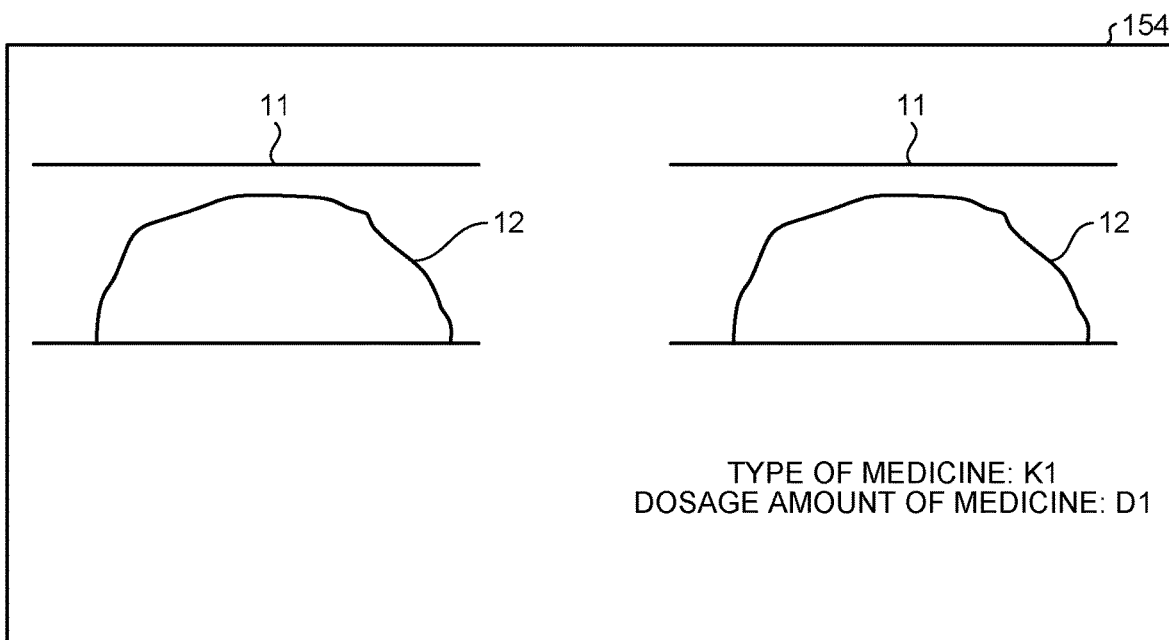
FIG. 15 is a diagram for explaining an example of the operations performed in the analysis device according to a sixth embodiment.

FIG. 15 is a diagram for explaining an example of the operations performed in the analysis device 150 according to the sixth embodiment. As illustrated in FIG. 15, the display control function 155e displays the following shapes side-by-side in the display 154: the shape of the plaque 12 at the timing $T_{N+1}$, at which the plaque 12 reaches the specific condition, in the first state; and the shape of the plaque 12 at the timing $T_{N+1}$, at which the plaque 12 reaches the specific condition, in the second state. The timing $T_{N+1}$ at which the plaque 12 reaches the specific condition in the first state may or may not be same as the timing $T_{N+1}$ at which the plaque 12 reaches the specific condition in the second state. As a result, it becomes possible for the user, such as a doctor, to confirm the prediction result about the shape of the plaque 12 when medication is given, and to confirm the prediction result about the shape of the plaque 12 when medication is not given. As a result, it becomes possible to support the user, such as a doctor, to perform diagnosis related to the diseases of blood vessels such as a coronary artery and to formulate a treatment plan.

Moreover, as illustrated in FIG. 15, the display control function 155e displays, in the display 154, a type "K1" and a dosage amount "D1" of the medicine administered to the subject. As a result, it becomes possible for the user, such as a doctor, to confirm the type and the dosage amount of the medicine used at the time of medication. Thus, from that perspective too, it becomes possible to support the user, such as a doctor, to perform diagnosis related to the diseases of blood vessels such as a coronary artery and to formulate a treatment plan.

Moreover, the display control function 155e can also display, in the display 154, the timing $T_{N+1}$ at which the plaque 12 reaches the specific condition in the first state and the timing $T_{N+1}$ at which the plaque 12 reaches the specific condition in the second state.

Meanwhile, in the sixth embodiment, the timing at which the plaque 12 reaches the specific state is, for example, identical to the timing according to the fourth embodiment.

Till now, the explanation was given about an exemplary configuration of the analysis device 150 and the analysis system 100 according to the sixth embodiment. According to the sixth embodiment, as explained above, it becomes possible to support the user, such as a doctor, to perform diagnosis related to the diseases of blood vessels such as a coronary artery and to formulate a treatment plan.

Seventh Embodiment

In the sixth embodiment, the explanation is given about the case in which the analysis device 150 displays the prediction result about the shape of the plaque 12 when medication is given and displays the prediction result about the shape of the plaque 12 when medication is not given. Alternatively, the analysis device 150 can display the shape of the plaque 12 as predicted in each of a plurality of states in which a medicine is administered to the subject, with at least either the type or the dosage amount of the medicine being different from each other. That explanation is given below as a seventh embodiment.

In the seventh embodiment, the explanation is mainly given about the differences with the sixth embodiment. Thus, regarding the configuration identical to the sixth embodiment, the explanation is not given. For example, in the explanation of the seventh embodiment, the configuration identical to the sixth embodiment is referred to by the same reference numerals, and the explanation thereof is not given again.

In the seventh embodiment, in each of a plurality of states in which a medicine is administered to the subject, the analysis device 150 predicts the shape of the plaque at the timing $T_{N+1}$, at which the plaque 12 reaches the specific condition, according to the same method as implemented in the sixth embodiment. In those plurality of states, the medicine administered to the subject has at least either different types or different dosage amounts. The following explanation is given about two states representing the plurality of states. However, there can be three or more states as well.

For example, the explanation is given about the following two examples: the state in which a medicine having a type "K2" and a dosage amount "D2" is administered to the subject; and the state in which a medicine having a type "K3" and a dosage amount "D3" is administered to the subject. In the seventh embodiment, in each of those two states, the analysis device 150 predicts the shape of the plaque 12 at the timing $T_{N+1}$ at which the plaque 12 reaches the specific condition.

In the following explanation of the seventh embodiment, "the state in which the medicine having the type "K2" and the dosage amount "D2" is administered to the subject" is termed as a "first state". Moreover, in the following explanation of the seventh embodiment, "the state in which the medicine having the type "K3" and the dosage amount "D3" is administered to the subject" is termed as a "second state".

Figure 16:
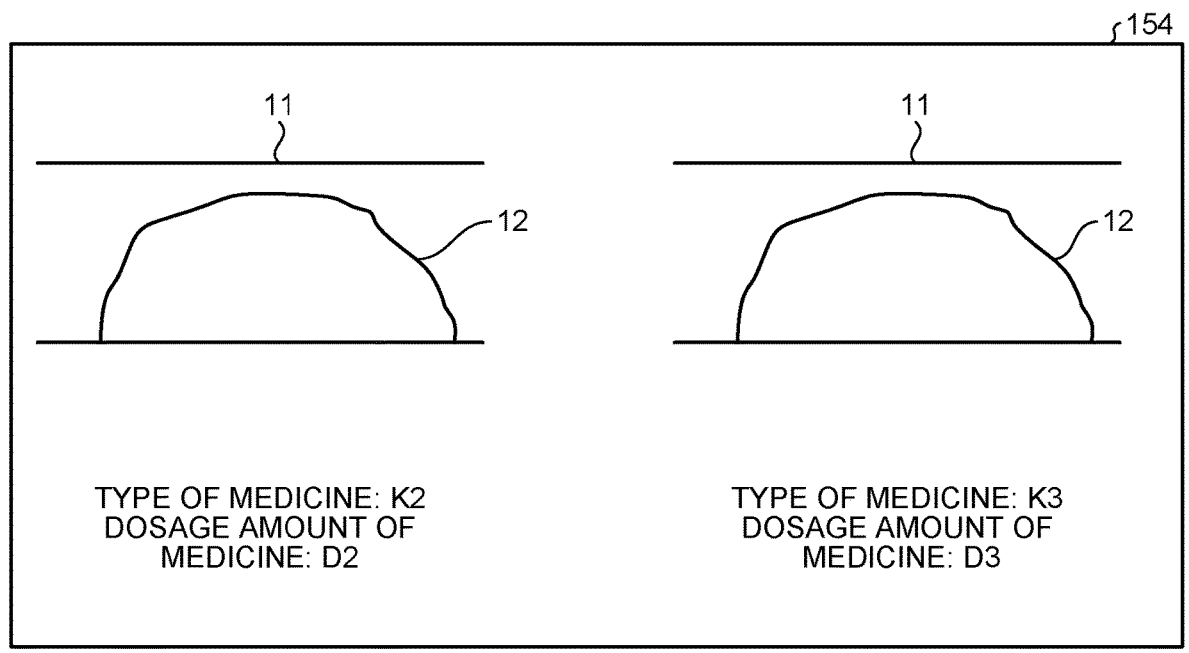
FIG. 16 is a diagram for explaining an example of the operations performed in the analysis device according to a seventh embodiment.

FIG. 16 is a diagram for explaining an example of the operations performed in the analysis device 150 according to the seventh embodiment. As illustrated in FIG. 16, the display control function 155e displays the following shapes side-by-side in the display 154: the shape of the plaque 12 at the timing $T_{N+1}$, at which the plaque 12 reaches the specific condition, in the first state; and the shape of the plaque 12 at the timing $T_{N+1}$, at which the plaque 12 reaches the specific condition, in the second state. The timing $T_{N+1}$ at which the plaque 12 reaches the specific condition in the first state may or may not be same as the timing $T_{N+1}$ at which the plaque 12 reaches the specific condition in the second state. As a result, it becomes possible for the user, such as a doctor, to confirm the prediction result about the shape of the plaque 12 when medication is given in the first state and to confirm the prediction result about the shape of the plaque 12 when medication is given in the second state. As a result, it becomes possible to support the user, such as a doctor, to perform diagnosis related to the diseases of blood vessels such as a coronary artery and to formulate a treatment plan.

Moreover, as illustrated in FIG. 16, the display control function 155e displays, in the display 154, the type "K2" and the dosage amount "D2" of the medicine as well as the type "K3" and the dosage amount "D3" of the medicine.

In the seventh embodiment, the timing at which the plaque 12 reaches the specific condition is identical to, for example, the timing according to the sixth embodiment. For example, in the seventh embodiment, the timing at which the plaque 12 reaches the specific condition is, for example, a specific timing after a predetermined period of time (for example, a few years) since the timing $T_0$. In that case, from among a plurality of shapes of the plaque 12 at the specific timing, the display control function 155e can display, in the display 154, the shape of the plaque 12 that does not cause a risk to the subject.

Till now, the explanation was given about an exemplary configuration of the analysis device 150 and the analysis system 100 according to the seventh embodiment. According to the seventh embodiment, as explained above, it becomes possible to support the user, such as a doctor, to perform diagnosis related to the diseases of blood vessels such as a coronary artery and to formulate a treatment plan.

Other Embodiments

In the embodiments and the modification examples described above, the explanation is given about the case in which CT image data is used as the medical image data. However, the embodiments are not limited to that case. Alternatively, for example, as long as the medical image data enables extraction of the shapes of blood vessels and the shapes of plaques, any type of medical image data can be used. For example, ultrasonic image data obtained by an ultrasound diagnostic device can be used, or MR image data obtained by an MRI device can be used.

Moreover, in the embodiments and the modification examples described above, the explanation is given about the case in which the calculation function 155c calculates the WSS as the plaque-related index. However, alternatively, as the plaque-related index, the calculation function 155c can calculate the vorticity of the blood flow in a predetermined three-dimensional region around the plaque. The vorticity of the blood flow in a predetermined three-dimensional region around the plaque also implies the vorticity of the blood flow within a predetermined region from the plaque. For example, at Step S104, the calculation function 155c can calculate the fluid parameters inside the blood vessel 11 at least based on the shape of the blood vessel 11; and can calculate the vorticity of the blood flow in a predetermined three-dimensional region around the plaque 12 at the timing $T_N$ based on the shape of the blood vessel at the timing $T_0$, the shape of the plaque 12 at the timing $T_N$, and the calculated fluid parameters.

In that case, instead of using the WSS, the prediction function 155d uses the vorticity and performs the operations identical to the operations according to the embodiments and the modification examples described above.

For example, when the calculated vorticity of the blood flow falls below a predetermined threshold value ε, the prediction function 155d can enlarge the shape of the plaque 12 at the timing $T_N$ and accordingly predict the shape of the plaque 12 at the timing $T_{N+1}$.

Moreover, when the calculated vorticity of the blood flow falls below the predetermined threshold value ε and when the maximum value of the difference in the vorticity of the blood flow in a predetermined three-dimensional region around the plaque 12 in one pulsation exceeds a predetermined threshold value ζ, the prediction function 155d can enlarge the shape of the plaque 12 at the timing $T_N$ and accordingly predict the shape of the plaque 12 at the timing $T_{N+1}$.

Furthermore, when the maximum value of the difference in the vorticity of the blood flow in a predetermined three-dimensional region around the plaque 12 in one pulsation exceeds the predetermined threshold value ζ, the prediction function 155d can enlarge the shape of the plaque 12 at the timing $T_N$ and accordingly predict the shape of the plaque 12 at the timing $T_{N+1}$.

Moreover, when the difference between the vorticity of the blood flow in a predetermined time phase during systole in one pulsation and the vorticity of the blood flow in a predetermined time phase during diastole exceeds a predetermined threshold value η, the prediction function 155d can enlarge the shape of the plaque 12 at the timing $T_N$ and accordingly predict the shape of the plaque 12 at the timing $T_{N+1}$.

Furthermore, in the normal direction of each of a plurality of positions 12a on the outer surface of the plaque 12 corresponding to the timing $T_N$, the prediction function 155d can enlarge the shape of the plaque 12 from the concerned position 12a by the size that is in accordance with the vorticity.

Moreover, when the calculated vorticity of the blood flow is equal to or greater than the predetermined threshold value c, the prediction function 155d can set the physical properties of the plaque 12 at the timing $T_{N+1}$ in such a way that the plaque 12 at the timing $T_{N+1}$ would be harder than the plaque 12 at the timing $T_N$.

Furthermore, when the calculated vorticity of the blood flow is equal to or smaller than a predetermined threshold value β that is smaller than the predetermined threshold value c, the prediction function 155d can set the physical properties of the plaque 12 at the timing $T_{N+1}$ in such a way that the plaque 12 at the timing $T_{N+1}$ would be softer than the plaque 12 at the timing $T_N$.

Moreover, as the plaque-related index, the calculation function 155c can calculate the dispersion of the blood flow velocity in a predetermined region (a two-dimensional region or a three-dimensional region) around the plaque. Higher the calculated dispersion, the greater becomes the variability in the blood flow velocity in the predetermined region around the plaque. The dispersion of the blood flow velocity in a predetermined region around the plaque also implies the blood flow velocity within a predetermined range from the plaque. For example, at Step S104, the calculation function 155c can calculate the fluid parameters in the blood vessel 11 at least based on the shape of the blood vessel 11; and can calculate the dispersion of the blood flow velocity in a predetermined region around the plaque 12 at the timing $T_N$ based on the shape of the blood vessel 11 at the timing $T_0$, the shape of the plaque 12 at the timing $T_N$, and the calculated fluid parameters.

In that case, instead of using the WSS, the prediction function 155d uses the dispersion and performs the operations identical to the operations according to the embodiments and the modification examples described above.

For example, when the calculated dispersion of the blood flow velocity falls below a predetermined threshold value t, the prediction function 155d can enlarge the shape of the plaque 12 at the timing $T_N$ and accordingly predict the shape of the plaque 12 at the timing $T_{N+1}$.

Moreover, when the calculated dispersion of the blood flow velocity falls below the predetermined threshold value τ and when the difference in the dispersion of the blood flow velocity in a predetermined region around the plaque 12 in one pulsation exceeds a predetermined threshold value κ, the prediction function 155d can enlarge the shape of the plaque 12 at the timing $T_N$ and accordingly predict the shape of the plaque 12 at the timing $T_{N+1}$.

Furthermore, when the difference in the dispersion of the blood flow velocity in a predetermined region around the plaque 12 in one pulsation exceeds the predetermined threshold value κ, the prediction function 155d can enlarge the shape of the plaque 12 at the timing $T_N$ and accordingly predict the shape of the plaque 12 at the timing $T_{N+1}$.

Moreover, when the difference between the dispersion in the blood flow velocity in a predetermined time phase during systole in one pulsation and the dispersion in the blood flow velocity in a predetermined time phase during diastole exceeds a predetermined threshold value λ, the prediction function 155d can enlarge the shape of the plaque 12 at the timing $T_N$ and accordingly predict the shape of the plaque 12 at the timing $T_{N+1}$.

Furthermore, in the normal direction of each of a plurality of positions 12a on the outer surface of the plaque 12 corresponding to the timing $T_N$, the prediction function 155d can enlarge the shape of the plaque 12 from the concerned position 12a by the size that is in accordance with the dispersion of the blood flow velocity.

Moreover, when the calculated dispersion of the blood flow velocity is equal to or greater than the predetermined threshold value t, the prediction function 155d can set the physical properties of the plaque 12 at the timing $T_{N+1}$ in such a way that the plaque 12 at the timing $T_{N+1}$ would be harder than the plaque 12 at the timing $T_N$.

Furthermore, when the calculated dispersion of the blood flow velocity is equal to or greater than a predetermined threshold value μ that is smaller than the predetermined threshold value t, the prediction function 155d can set the physical properties of the plaque 12 at the timing $T_{N+1}$ in such a way that the plaque 12 at the timing $T_{N+1}$ would be softer than the plaque 12 at the timing $T_N$.

Meanwhile, the term "processor" used in the description of the embodiments implies, for example, a central processing unit (CPU), or a graphics processing unit (GPU), or an application specific integrated circuit (ASIC), or a programmable logic device (such as a simple programmable logic device (SPLD), or a complex programmable logic device (CPLD), or a field programmable gate array (FPGA)). Moreover, instead of storing computer programs in the memory circuit 152, they can be directly incorporated into the circuitry of a processor. In that case, the processor reads the computer programs incorporated in the circuitry and executes them so that the functions get implemented. Meanwhile, the processors according to the embodiments are not limited to be configured using a single circuit on a processor-by-processor basis. Alternatively, a single processor can be configured by combining a plurality of independent circuits, and the corresponding functions can be implemented.

A computer program executed by a processor are stored in advance in a read only memory (ROM) or a memory circuit. Alternatively, the computer program can be recorded as an installable file or an executable file in a non-transitory computer-readable recording medium such as a compact disk read only memory (CD-ROM), a flexible disk (FD), a compact disk recordable (CD-R), or a digital versatile disk (DVD). Thus, a computer can read the medical information processing program from a recording medium and execute it. Still alternatively, the computer program can be stored in a downloadable manner in a computer that is connected to a network such as the Internet. For example, the computer program is configured using modules of the processing functions explained above. As far as the actual hardware is concerned, a CPU reads the computer program from a memory medium such as a ROM and executes it, so that the modules get loaded and generated in a main memory device.

In the embodiments and the modification examples described above, the constituent elements of the device illustrated in the drawings are merely conceptual, and need not be physically configured as illustrated. The constituent elements, as a whole or in part, can be separated or integrated either functionally or physically based on various types of loads or use conditions. The processing functions implemented by the device are entirely or partially implemented by the CPU or by computer programs that are analyzed and executed by the CPU, or are implemented as hardware by wired logic.

Of the processes described in the embodiments, all or part of the processes explained as being performed automatically can be performed manually. Similarly, all or part of the processes explained as being performed manually can be performed automatically by a known method. The processing procedures, the control procedures, specific names, various data, and information including parameters described in the embodiments or illustrated in the drawings can be changed as required unless otherwise specified.

According to at least one of the embodiments or at least one of the modification examples, it becomes possible to predict the condition of a plaque in the relatively distant future.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An analysis device comprising:
processing circuitry that
extracts, from medical image data, shape of a blood vessel of a subject and shape of a plaque formed in the blood vessel,
calculates a fluid parameter inside the blood vessel at least based on shape of the blood vessel, and calculates, while changing a first-type timing in sequence, an index related to the plaque at concerned first-type timing based on shape of the blood vessel, based on shape of the plaque at concerned first-type timing, and based on the fluid parameter,
predicts shape of the plaque at a second-type timing, which is next timing to the first-type timing, based on the index at the first-type timing, and
displays, in a display, the predicted shape of the plaque at the second-type timing at which the plaque reaches a specific condition, wherein
the processing circuitry predicts the shape of the plaque at the second-type timing based on a magnitude of shear stress exerted on the plaque at the first-type timing as indicated by the index at the first-type timing and a first threshold value.

2. The analysis device according to claim 1, wherein the processing circuitry displays, in the display, the predicted shape of the plaque at the second-type timing at which growth of the plaque ends.

3. The analysis device according to claim 1, wherein the processing circuitry displays, in the display, the predicted shape of the plaque at the second-type timing at which the plaque reaches a condition of causing a risk to the subject.

4. The analysis device according to claim 3, wherein the processing circuitry displays, in the display, the predicted shape of the plaque at the second-type timing at which the plaque reaches a ruptured condition.

5. The analysis device according to claim 3, wherein the processing circuitry displays, in the display, the predicted shape of the plaque at the second-type timing at which the plaque reaches a condition of blocking blood flow in the blood vessel.

6. The analysis device according to claim 1, wherein the processing circuitry
receives at least one instruction from among
an instruction for correcting shape of the blood vessel,
an instruction for correcting a first-type parameter related to blood flowing into the blood vessel, and
an instruction for correcting a second-type parameter related to blood flowing away from the blood vessel, and
calculates the index based on at least one from among shape of the blood vessel, the first-type parameter and the second-type parameter as corrected by the at least one instruction that is received.

7. The analysis device according to claim 1, wherein, when the magnitude of shear stress exerted on the plaque at the first-type timing as indicated by the index at the first-type timing falls below the first threshold value, the processing circuitry enlarges shape of the plaque at the second-type timing to be greater than shape of the plaque at the first-type timing, and accordingly predicts shape of the plaque at the second-type timing.

8. The analysis device according to claim 1, wherein, when the magnitude of shear stress exerted on the plaque at the first-type timing as indicated by the index at the first-type timing falls below the first threshold value and when maximum value of difference in the shear stress in one pulsation exceeds a second threshold value, the processing circuitry enlarges shape of the plaque at the second-type timing to be greater than shape of the plaque at the first-type timing, and accordingly predicts shape of the plaque at the second-type timing.

9. The analysis device according to claim 7, wherein, in normal direction of each of a plurality of positions on outer surface of the plaque at the first-type timing, the processing circuitry enlarges shape of the plaque from concerned position by predetermined size, and accordingly predicts shape of the plaque at the second-type timing.

10. The analysis device according to claim 7, wherein, in normal direction of each of a plurality of positions on outer surface of the plaque at the first-type timing, the processing circuitry enlarges shape of the plaque from concerned position by size that is in accordance with the shear stress, and accordingly predicts shape of the plaque at the second-type timing.

11. The analysis device according to claim 7, wherein, in normal direction of each of a plurality of positions on outer surface of the plaque at the first-type timing, the processing circuitry enlarges shape of the plaque from concerned position by size that is in accordance with an angle made between normal direction of concerned position and direction of blood flow in the blood vessel, and accordingly predicts shape of the plaque at the second-type timing.

12. The analysis device according to claim 7, wherein, also when the magnitude of the shear stress is equal to or greater than the first threshold value, the processing circuitry sets physical property of the plaque at the second-type timing in such a way that the plaque at the second-type timing is harder than the plaque at the first-type timing.

13. The analysis device according to claim 7, wherein, also when the magnitude of the shear stress is equal to or smaller than a third threshold value that is smaller than the first threshold value, the processing circuitry sets physical property of the plaque at the second-type timing in such a way that the plaque at the second-type timing is softer than the plaque at the first-type timing.

14. The analysis device according to claim 1, wherein the processing circuitry
calculates the index in each of a plurality of states in which a stent is placed inside the blood vessel, with at least either position or length of the stent placed inside the blood vessel being different than each other,
predicts shape of the plaque in each of the plurality of states, and
displays, in the display, the predicted shape of the plaque at the second-type timing at which the plaque in each of the plurality of states reaches the specific state.

15. The analysis device according to claim 1, wherein, when maximum value of difference in vorticity of blood flow within a predetermined range from the plaque in one pulsation exceeds a threshold value, the processing circuitry enlarges shape of the plaque at the second-type timing to be greater than shape of the plaque at the first-type timing, and accordingly predicts shape of the plaque at the second-type timing.

16. The analysis device according to claim 15, wherein, in normal direction of each of a plurality of positions on outer surface of the plaque at the first-type timing, the processing circuitry enlarges shape of the plaque from concerned position by size that is in accordance with the vorticity, and accordingly predicts shape of the plaque at the second-type timing.

17. The analysis device according to claim 15, wherein, also when the vorticity is equal to or greater than the first threshold value, the processing circuitry sets physical property of the plaque at the second-type timing in such a way that the plaque at the second-type timing is harder than the plaque at the first-type timing.

18. The analysis device according to claim 15, wherein, also when the vorticity is equal to or smaller than a third threshold value that is smaller than the first threshold value, the processing circuitry sets physical property of the plaque at the second-type timing in such a way that the plaque at the second-type timing is softer than the plaque at the first-type timing.

19. The analysis device according to claim 1, wherein, in normal direction of each of a plurality of positions on outer surface of the plaque at the first-type timing, the processing circuitry enlarges shape of the plaque from concerned position by size that is in accordance with dispersion of blood flow rate, and accordingly predicts shape of the plaque at the second-type timing.

20. The analysis device according to claim 1, wherein, also when dispersion of blood flow rate is equal to or greater than the first threshold value, the processing circuitry sets physical property of the plaque at the second-type timing in such a way that the plaque at the second-type timing is harder than the plaque at the first-type timing.

21. The analysis device according to claim 1, wherein, also when dispersion of blood flow rate is equal to or smaller than a third threshold value that is smaller than the first threshold value, the processing circuitry sets physical property of the plaque at the second-type timing in such a way that the plaque at the second-type timing is softer than the plaque at the first-type timing.

22. An analysis system comprising:
a medical image diagnostic device; and
an analysis device, wherein
the medical image diagnostic device includes processing circuitry that generates medical image data in which a blood vessel of a subject and a plaque formed in the blood vessel are drawn, and
the analysis device includes processing circuitry that
obtains the medical image data,
extracts shape of a blood vessel of a subject and shape of a plaque formed in the blood vessel,
calculates a fluid parameter inside the blood vessel at least based on shape of the blood vessel, and calculates, while changing a first-type timing in sequence, an index related to the plaque at concerned first-type timing based on shape of the blood vessel, based on shape of the plaque at concerned first-type timing, and based on the fluid parameter,
predicts shape of the plaque at a second-type timing, which is next timing to the first-type timing, based on the index at the first-type timing, and
displays, in a display, the predicted shape of the plaque at the second-type timing at which the plaque reaches a specific condition, wherein
the processing circuitry, which is included in the analysis device, predicts the shape of the plaque at the second-type timing based on a magnitude of shear stress exerted on the plaque at the first-type timing as indicated by the index at the first-type timing and a first threshold value.

23. An analysis method comprising:
extracting, from medical image data, shape of a blood vessel of a subject and shape of a plaque formed in the blood vessel;
calculating that includes
calculating a fluid parameter inside the blood vessel at least based on shape of the blood vessel, and
calculating, while changing a first-type timing in sequence, an index related to the plaque at concerned first-type timing based on shape of the blood vessel, based on shape of the plaque at concerned first-type timing, and based on the fluid parameter;
predicting shape of the plaque at a second-type timing, which is next timing to the first-type timing, based on the index at the first-type timing; and
displaying, in a display, the predicted shape of the plaque at the second-type timing at which the plaque reaches a specific condition, wherein
the predicting the shape of the plaque including the shape of the plaque at the second-type timing based on a magnitude of shear stress exerted on the plaque at the first-type timing as indicated by the index at the first-type timing and a first threshold value.

* * * * *